United States Patent
Butler et al.

(10) Patent No.: US 7,304,984 B2
(45) Date of Patent: Dec. 4, 2007

(54) METHODS AND SYSTEMS FOR CREATING, DISTRIBUTING AND EXECUTING MULTIMEDIA TELECOMMUNICATIONS APPLICATIONS OVER CIRCUIT AND PACKET SWITCHED NETWORKS

(75) Inventors: David Butler, North Miami Beach, FL (US); R. David Freedman, Ft. Lauderdale, FL (US); Del Stevens, Weston, FL (US)

(73) Assignee: Convergent Networks, Inc., Lowell, MA (US)

( * ) Notice: Subject to any disclaimer, the term of this patent is extended or adjusted under 35 U.S.C. 154(b) by 1114 days.

(21) Appl. No.: 10/181,748

(22) PCT Filed: Feb. 9, 2001

(86) PCT No.: PCT/US01/04449

§ 371 (c)(1),
(2), (4) Date: Jul. 18, 2002

(87) PCT Pub. No.: WO01/60000

PCT Pub. Date: Aug. 16, 2001

(65) Prior Publication Data

US 2003/0012183 A1 Jan. 16, 2003

Related U.S. Application Data

(60) Provisional application No. 60/182,111, filed on Feb. 11, 2000, provisional application No. 60/181,676, filed on Feb. 11, 2000.

(51) Int. Cl.
*H04L 12/66* (2006.01)

(52) U.S. Cl. .................... 370/352; 370/388; 370/395.2; 370/401; 379/211.02

(58) Field of Classification Search ........ 370/352–356, 370/360, 401, 466, 467, 388, 395.2; 379/88.13, 379/908, 211, 211.01, 211.02; 719/322; 707/104.1

See application file for complete search history.

(56) References Cited

U.S. PATENT DOCUMENTS

| | | | |
|---|---|---|---|
| 4,788,718 A | 11/1988 | McNabb et al. | 379/113 |
| 5,515,425 A | 5/1996 | Penzias et al. | 379/114 |
| 5,568,487 A | 10/1996 | Sitbon et al. | 370/94.1 |
| 5,687,223 A | 11/1997 | Elliott et al. | 379/113 |
| 5,712,908 A | 1/1998 | Brinkman et al. | 379/119 |
| 5,727,051 A | 3/1998 | Holender | 379/112 |
| 5,732,127 A | 3/1998 | Hayes | 379/115 |
| 5,754,634 A | 5/1998 | Kay et al. | 379/134 |
| 5,764,740 A | 6/1998 | Holender | 379/112 |
| 5,793,852 A | 8/1998 | Kang et al. | 379/115 |
| 5,799,073 A | 8/1998 | Fleischer, III et al. | 379/113 |
| 5,809,119 A | 9/1998 | Tounomura et al. | 379/112 |
| 5,859,899 A | 1/1999 | Sakai et al. | 379/92.01 |
| 5,912,954 A | 6/1999 | Whited et al. | 379/115 |
| 5,937,035 A | 8/1999 | Andruska et al. | 379/34 |
| 5,940,480 A | 8/1999 | Jeon et al. | 379/113 |

(Continued)

*Primary Examiner*—Afsar Qureshi
(74) *Attorney, Agent, or Firm*—Gordon & Jacobson, PC

(57) ABSTRACT

A service creation switch (114) supports both tightly coupled and loosely distributed application server (AS) (126) functions, with the tightly coupled AS (126) functions residing in the switch (114), and the loosely coupled AS (126) functions carried out in a service level executable environment (SLEE) (34). The SLEE (134) utilizes DLLs to facilitate the distribution of services over a packet network.

25 Claims, 10 Drawing Sheets

U.S. PATENT DOCUMENTS

| | | | |
|---|---|---|---|
| 5,961,586 A | 10/1999 | Pedersen | 709/201 |
| 5,966,431 A | 10/1999 | Reiman et al. | 379/115 |
| 5,991,377 A | 11/1999 | Malik | 379/114 |
| 6,002,754 A | 12/1999 | Jaiswal et al. | 379/115 |
| 6,031,840 A | 2/2000 | Christie et al. | 370/410 |
| 6,069,890 A | 5/2000 | White et al. | 370/352 |
| 6,173,437 B1 | 1/2001 | Polcyn | 717/1 |
| 2003/0108176 A1* | 6/2003 | Kung et al. | 379/211.02 |

* cited by examiner

METHODS AND SYSTEMS FOR CREATING, DISTRIBUTING AND EXECUTING MULTIMEDIA TELECOMMUNICATIONS APPLICATIONS OVER CIRCUIT AND PACKET SWITCHED NETWORKS

This application claims the benefit of provisional applications U.S. Serial Nos. 60/182,111 and 60/181,676, both filed Feb. 11, 2000.

BACKGROUND OF THE INVENTION

1. Field of the Invention

This invention relates broadly to telecommunications. More particularly, this invention relates to a switching infrastructure and development environment for telecommunication applications.

2. State of the Art

For much of the history of the telecommunications industry, telephone calls have been connected primarily via the public switch telephone network (PSTN), a point-to-point telecommunications network. The PSTN includes end office (EO) and access tandem (AT) switches. The EO switches connect a local carrier to a subscriber (a party capable of making or receiving a call), and the AT switches connect local carriers and other intermediary AT switches together. In the PSTN, a path (circuit) is defined between the calling party and the called party through the EO and AT switches, and the call is connected over this path. For a long time, signaling associated with the call (e.g., information about the route through various switches to the called party) and the call content (e.g., analog voice signals) were sent over the same path in the network.

The PSTN was designed to handle voice calls having an average duration of five minutes. Due to a change in calling patterns, in which the average call has become longer, the PSTN network has become quite congested. The reason for the change in calling patterns is, at least in part, a result of the popularity of the Internet and an associated increased data traffic from modem use. Modem calls are typically relatively longer than voice calls, averaging thirty minutes in duration.

As a partial solution to the congestion, the SS7 (signaling system 7) system was deployed. In SS7, the signaling for setting up a path for the call is sent "out-of-band" (over a discrete network), and the call is then connected via a path through the legacy PSTN. While this removes the signaling traffic from the PSTN network switches, even this system does not satisfactorily relieve the PSTN network congestion.

In the 1980's, long distance telecommunication was deregulated. New long distance companies, such as MCI and Sprint, among others, were granted equal access to end-office (EO) switches at the local exchange carrier central office in order to compete directly with AT&T by installing their own access tandem (AT) switches and their own long distance network.

With the Telecommunications Act of 1996, competition was opened for local telephone service, giving rise to competitive local exchange carriers (CLECs). CLECs were permitted equal access to the AT switches of the long distance companies, and local exchanges needed to make space available in their central offices for a competitor's EO switch. As such, the regulatory guidelines that governed the separation of functionalities which previously existed between an AT exchange (switch) and an equal access EO exchange have for the most part diminished. Therefore, switching systems residing in the local exchange today typically have both end-office and access tandem functionality; hence, the term EO/AT.

Given the increase in competition created by deregulation, the cost to the consumer to make a voice call, both local and long distance, has decreased. Consequently, the per call profit to the call provider has also decreased. As such, call providers have been eager to offer profit-making value-added enhanced services above and beyond Class 5 services such as caller-ID, three-way calling, call waiting, etc. Originally, these services were implemented on the EO switches; a typical implementation occurred on the EO switch of the called party. The implementation was "hard coded" into the switch, and a call provider was tied to the EO-switch vendor for services.

It was therefore desired to implement enhanced services in a manner which was both effective and did not rely on the switch vendor for services. To meet this need, the Advanced Intelligent Network (AIN) has been implemented in some areas. The AIN comprises service control points in the SS7 network and operates to move call services away from the traffic switches to de-couple service logic from the switching function and provide an enhanced system of service distribution and third party service suppliers. However, the AIN system has been hindered by SS7 interoperability issues with respect to different Tier 1 International Carriers and also due to vendor-specific implementations. That is, an implementation of the AIN system is confined to a particular geographic area and/or vendor. For example, in Europe there are multiple carriers, each using a different and incompatible AIN protocol.

During the 1990's, the Internet grew at a tremendous rate. Traffic over the Internet is transferred in a uniform manner using Internet Protocol (IP). The IP network therefore has an architecture adapted to provide communication and services over a single and uniformly compatible system worldwide. As such, the IP (or other packet) network has been recognized as a possible substitute for the PSTN.

However, moving from the PSTN system to an IP (or other type of packet) network would require the challenging integration of the IP network with the legacy PSTN system. This is because any change from the PSTN system would necessarily be deployed over time. In addition, the IP network is a packet-based network. This is suitable for viewing web pages on the world-wide web where timing is not critical. It would be ideal to move enhanced call services away from the EO/AT switches and make available and distribute call services in a non-localized manner, similar to the manner in which web pages are made available. Yet, for some call services latency is critical.

Services are distinguished by class, with Class 5 service functions (e.g., three-way calling) requiring practically immediate implementation upon request and therefore residing onboard the stored program control switch (SPCS) in the PSIN. Over the years these embedded service functions have been highly optimized. In fact, it takes only 50-120 milliseconds for an SPCS to route a call to its destination from the time a user goes off-hook and dials the number, inclusive of cycling through a Class 5 feature interaction. This time measurement is referred to as the Class 5 delay budget, and is relatively immovable, as callers expect immediate response for such services. This benchmark poses significant challenges to next-generation telecommunication architecture utilizing an IP network.

When referring to "next-generation" architecture, it is presumed that the application server (AS) which handles the enhanced services will reside separately from the basic call processes (BCP), or call control elements, in the network.

Where the AS has been decoupled from a-switch, interworking between the decoupled AS and the switch is often implemented using the H.323 Initiation Protocol (SIP). However, there is no evidence that a decoupled AS can be used in a loosely decoupled fashion to implement a Class 5 service in a production network. The Class 5 delay budget imposes an insurmountable barrier to Class 5 service distribution. As such, there is a significant difference between emulation of a Class 5 service in an offline laboratory, and actually replacing a Class 5 end-office switch delivering primary line telephone service to thousands of subscriber lines.

Moreover, once the challenge of integrating the IP and PSTN networks is accepted, it would be further beneficial to have a programming environment which is adapted to facilitate creation, deployment and distribution of enhanced services over the integrated network. Service distribution operates to relieve network congestion. Moreover, service distribution over an IP network reduces the relative high costs associated with using the PSTN for the implementation of such services.

For purposes of this disclosure, the telecommunications network(s) is often referred to using the following suggestive abstract terms: the media transport plane, the signalling and control plane, the application services plane, and the management plane. The media transport plane defines the portion of the network devoted to delivering content from one point (or multipoints) to another point (or multipoints) in the networt. The signalling and control plane is primarily used to set up and tear down connections. The application services plane is the portion of the network used to deliver enhanced services. The management plane is used for billing, record keeping, provisioning, etc.

Over the last several years, the the efforts of the telecommunications industry to integrate the PSTN with an IP network have been spent largely in proving out the new voice over packet switching technologies which primarily address the media transport plane. To a lesser extent, softswitches, which address the signaling and control plane in the new generation network have just come onto the horizon. This adoption cycle, albeit necessary, has continued at the expense of not realizing any significant advancements in telecommunications service delivery on a large scale during the same time period.

SUMMARY OF THE INVENTION

It is therefore an object of the invention to provide a network architecture that can be deployed in stages.

It is another object of the invention to provide a next generation network architecture that is suitable for both the PSTN and IP networks.

It is a further object of the invention to provide an integrated network that can deploy multiple types and classes of services.

It is an additional object of the invention to provide an integrated network that can implement Class 5 services and meet the Class 5 delay budget, i.e. a method for implementing service execution functional entities in a tightly-coupled fashion in relation to a softswitch, such that the service execution functional entities operate in a similar fashion to that of an SPCS.

It is also an object of the invention to provide a Class 5 end-office switching in a next generation IP network, i.e. a method for implementing service execution functional entities in a loosely-coupled fashion in relation to a softswitch, such that the service execution functional entities operate in a similar fashion to fully detached Application Servers on an IP network (such as the Internet).

It is still another object of the invention to provide an integrated system capable of distributing enhanced services over the network.

It is still a further object of the invention to provide an integrated network in which services are distributed in a manner which permits service latency requirements to be met, i.e. a method for providing location transparency or abstraction of the distribution of the service execution functional entities from its users.

It is yet another object of the invention to provide a developer environment for creating, deploying, and distributing services across a next generation IP network.

It is another object of the invention to provide a method for intercommunication between service execution functional entities and a softswitch.

It is also an object of the invention to provide a method for intercommunication between individual service execution functional entities.

It is still another object of the invention to provide a method for dynamically duplicating or 'cloning' individual service execution functional entities such that the availability of a particular application or application feature may increase proportionally with demand.

It is yet another object of the invention to provide a client system for creating, naming, cataloguing, reusing, combining and re-combining service execution functional entities.

It is another object of the invention to provide a server system for storing service execution functional entities and for distributing executable service applications.

It is still another object of the invention to provide a client system for managing the server systems.

It is yet another object of the invention to provide client and server systems for run-time management of individual service execution functional entities.

It is another object of the invention to provide client and server systems for creating, naming, cataloging and distributing state transition tables.

In accord with these objects, which will be discussed in detail below, a next generation telecommunications network architecture according to the invention efficiently integrates and offers services in both the PSTN and an IP network. The enveloping architecture generally includes signaling gateways (SG) connected directly to the SS7 network for PSTN signaling support, one or more service creation switches (SX) coupled to each SG, and a plurality of media gateways (MG) (or broadband switches) coupled to each SX. Each MG includes hardware responsible for switching and interworking (converting signals) between the IP and PSTN networks.

The SX is preferably implemented in software and includes a media gateway controller (MGC) and a calling agent (CA). The MGC is responsible for controlling a set of endpoints across a given set of MGs, the set of endpoints comprising a domain. The CA contains the intelligence and policies used by the MGC to make routing decisions, as well as provides service interworking functionality; i.e., the CA works in conjunction with an application providing a service on a user's line. According to the invention, the SX supports both tightly coupled and loosely distributed application server (AS) functions, with the tightly coupled AS functions (such as Class 5 services) residing in the SX, and the loosely coupled AS functions (e.g., voice mail) carried out in a service level executable environment (SLEE), described below. From a network perspective, the SX provides the basic connection control function over a domain of endpoints which may be media channels in a media gateway, subscriber line terminations in a residential gateway, or digital circuits in a trunking gateway. The capability of the SX to support both tightly and loosely coupled AS functions is a critical advantage over other proposed next-generation solutions. According to the presently preferred embodiment, the SLEE carries out both loosely coupled and tightly coupled services, with a portion of the SLEE embodied in the SX.

More particularly, the SLEE includes an application creation and management environment which utilizes dynamically loaded shared libraries (DLLs) to facilitate the deployment and distribution of enhanced services over the integrated network. The SLEE has an application layer, a Soft switch interworking layer, and a Media server interworking layer, and also includes run time commands suitable for debugging application files. The SLEE receives wervice request messages from an SX or user agent through an API, the SLEE Library, and is responsible for communicating with the Soft switch interworking layer and the Media server interworking layer. In the interworking layers (the capability layer), the SLEE loads specific application triggering mechanisms which include a project state machine. The project state machine is a shared library loaded by the SLEE. Each project also has a different state machine that governs events at a finer level. The logic that handles each event is written in a scripting language and then compiled into the DLLs.

The SLEE can operate in a Loosely Coupled Mode, Mode 1, or a Tightly Coupled Mode, Mode 2. From the perspective of a single softswitch, it is possible to implement one SLEE operating in Mode 2 and one or more SLEEs operating in Mode 1. Furthermore, from a network perspective it is possible to implement a plurality of SLEE in either mode of operation.

When describing applications for the Decoupled Telecommunications System, there are two broad classifications, Network Applications and User Applications.

An example of a Network application is broadband access. Broadband access is a superset of functionalities that embody all of the essential capabilities of a Class 5 SPCS (EO/AT) in the PSTN such that the User cannot distinguish between their Class 5 service delivered through a Decoupled Telecommunications System versus a Class 5 SPCS in the PSTN.

To achieve functional equivalence to the Class 5 SPCS in a Decoupled Telecommunications System, an equivalent state machine is created through the SLEE CPL and then mobilized into the softswitch. This state machine combines the Originating and Terminating basic call state machines specified by the ITU for Capability Set 2. The SLEE function which implements this composite state machine is the Basic Call Process (BCP). The BCP is a specialized implementation of the Application Services Interworking Layer. The BCP is a byproduct of the SLEE operating in mode 2. The BCP function facilitates tightly coupled interaction between the SLEE and the softswitch. The BCP is the 'gearbox', subject to the previous analogy. SLEE mode 2 is the appropriate operational mode for the broadband access network application because it incorporates user services which are subject to the 'delay budget'.

An example of a User application is Unified Messaging (UM). Although UM is a relatively complex application, it mainly involves repeated request/response pairs of user interactions where moderate delays are acceptable. SLEE mode 1 is the appropriate operational mode for the UM application because the delay budget is not an issue and the application generally involves lengthy interactive sessions between the SLEE and other distributed Application Server elements including media servers, messaging servers and web servers using protocols that are not typically supported in a softswitch.

Additional objects and advantages of the invention will become apparent to those skilled in the art upon reference to the detailed description taken in conjunction with the provided figures.

DETAILED DESCRIPTION OF THE PREFERRED EMBODIMENTS

In order to facilitate understanding of the detailed description, Table 1 is provided. Table 1 defines the acronyms used in the Specification and Drawings.

TABLE 1

| Acronym | Definitions |
| --- | --- |
| AAL-2 | ATM Adaption Layer 2 |
| AIN | Advanced Intelligent Network |
| AP | Application |
| API | Application Progranirning Interface |
| AS | Application Server |
| AS1, AS2 | Application Service Interfaces |
| ASI | Application Services Interworking |
| AT | Access Tandem |
| ATM | Asynchronous Transfer Mode |
| BCP | Basic Call Processing |
| BMS | Billing Management Platform |
| CA | Call Agent |
| CAS | Channel Associated Signaling |
| CDR | Call Detail Record |
| CID | Call Instance Data |
| CLI | Command Line Interface |
| CPL | Call Processing Language |
| DLL | Dynamically Loaded Shared Libraries |
| DNS | Dynamic Naming Services or Domain Name Server |
| DSLAM | Digital Subscriber Line Access Multiplexer |
| EMS | Element Management System |

TABLE 1-continued

Acronym Definitions

| | |
|---|---|
| EO | End Office |
| EO/AT | End Office/Access Tandem |
| GSI | Generic Signaling Interface |
| GW1 | Gateway Interface |
| HA | High Availability |
| HA1 | High Availability Interface |
| HTTP | Hypertext Transfer Protocol |
| IAD | Integrated Access Device |
| IETF | Internet Engineering Task Force |
| IN | Intelligent Network |
| IP | Internet Protocol |
| IPL | Initial Program Load |
| ISDN | Integrated Services Digital Network |
| ISUP | ISDN User Part |
| ITU | International Telecommunications Union |
| LAN | Local Area Network |
| M1, M2, M3, M4 | Management Interfaces |
| MG | Media Gateway (Broadband Switch) |
| MGC | Media Gateway Control |
| MGCP | Media Gateway Control Protocol |
| MIB | Management Information Base |
| MS | Media server |
| NCAS | Non-Channel Associated Signaling |
| NM | Network Management |
| O-BCSM | Originating Basic Call State Model |
| OSI | Open Systems Interconnection |
| OSS | Operations Support System |
| PIM | Protocol Independent Management |
| PRI | Primary Rate Interface |
| PSTN | Public Switched Telephone Network |
| S1, S2 | Signaling Interfaces |
| SCP | Service Control Point |
| SDP | Session Description Protocol |
| SG | Signaling Gateway |
| SIB | Service Independent Building Block |
| SIP | Simple Internet Protocol |
| SLEE | Service Level Executable Environment |
| SNMP | Simple Network Management Protocol |
| SPCS | Stored Program Control Switch |
| SPM | Signaling Protocol Multiplexing |
| SS | Soft Switch |
| SS7 | Signaling System 7 |
| SX | Service Creation Switch |
| TALI | Royalty Free Signaling Protocol Source Code from Tekelec |
| T-BCSM | Terminating Basic Call State Model |
| TCAP | Transaction Capabilities Application Part |
| TCP | Terminal Control Program |
| TDM | Time Division Multiplexing |
| UDP | User Datagram Protocol |
| UNI | User Network Interface |
| VC | Virtual Channel |
| WAN | Wide Area Network |
| XML | Extensible Markup Language |

Figure 1:
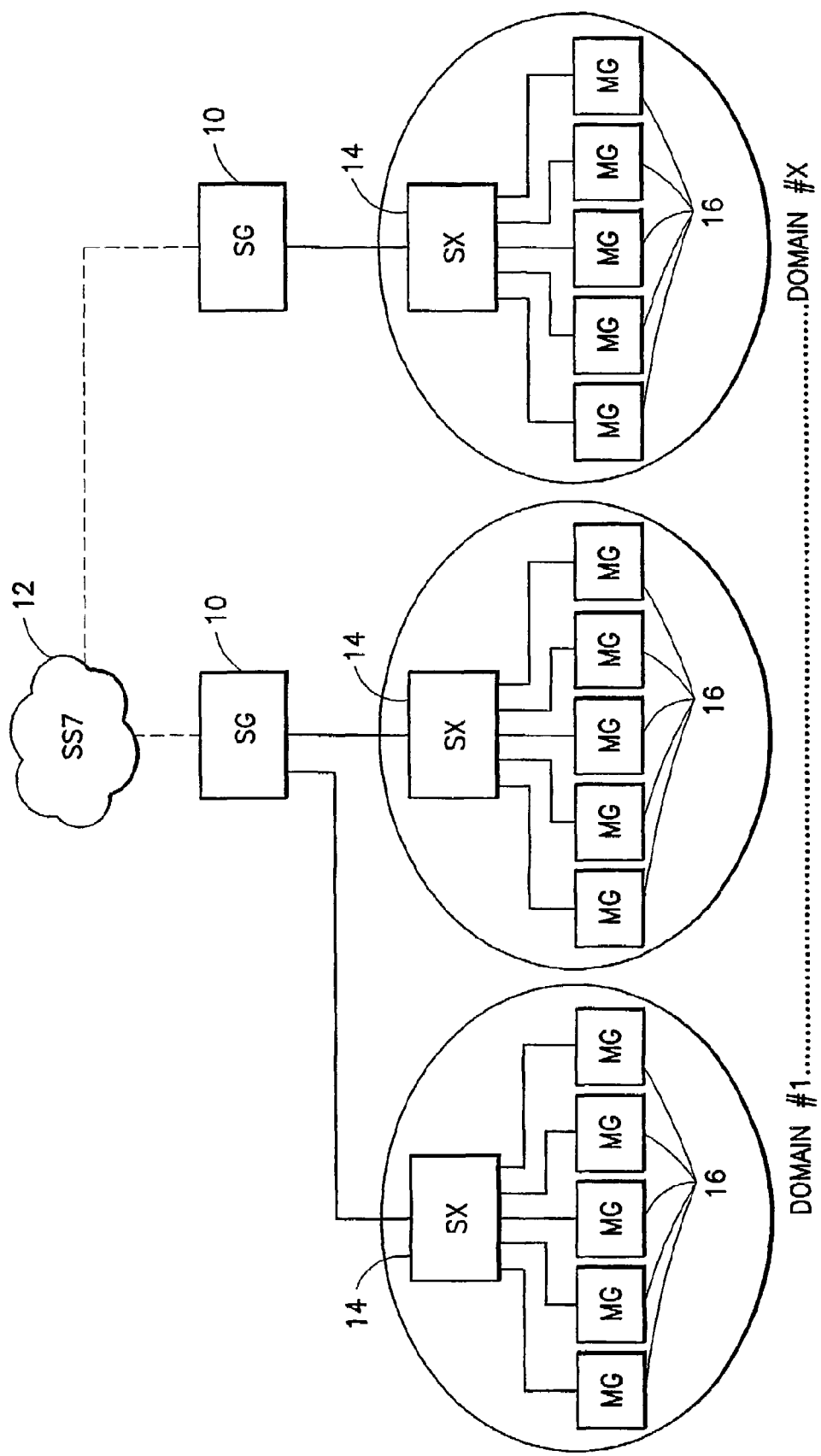
FIG. 1 is a high-level schematic diagram of the next generation network architecture of the invention.

Turning now to FIG. 1, a next generation telecommunications network architecture according to the invention integrates PSTN and IP networks. The architecture generally includes signaling gateways (SG) 10 connected directly to the SS7 network 12 for PSTN signaling support, one or more service creation switches (SX) 14 coupled to each SG 10, and a plurality of media gateways (MG) 16 coupled to each SX 14.

Figure 3:
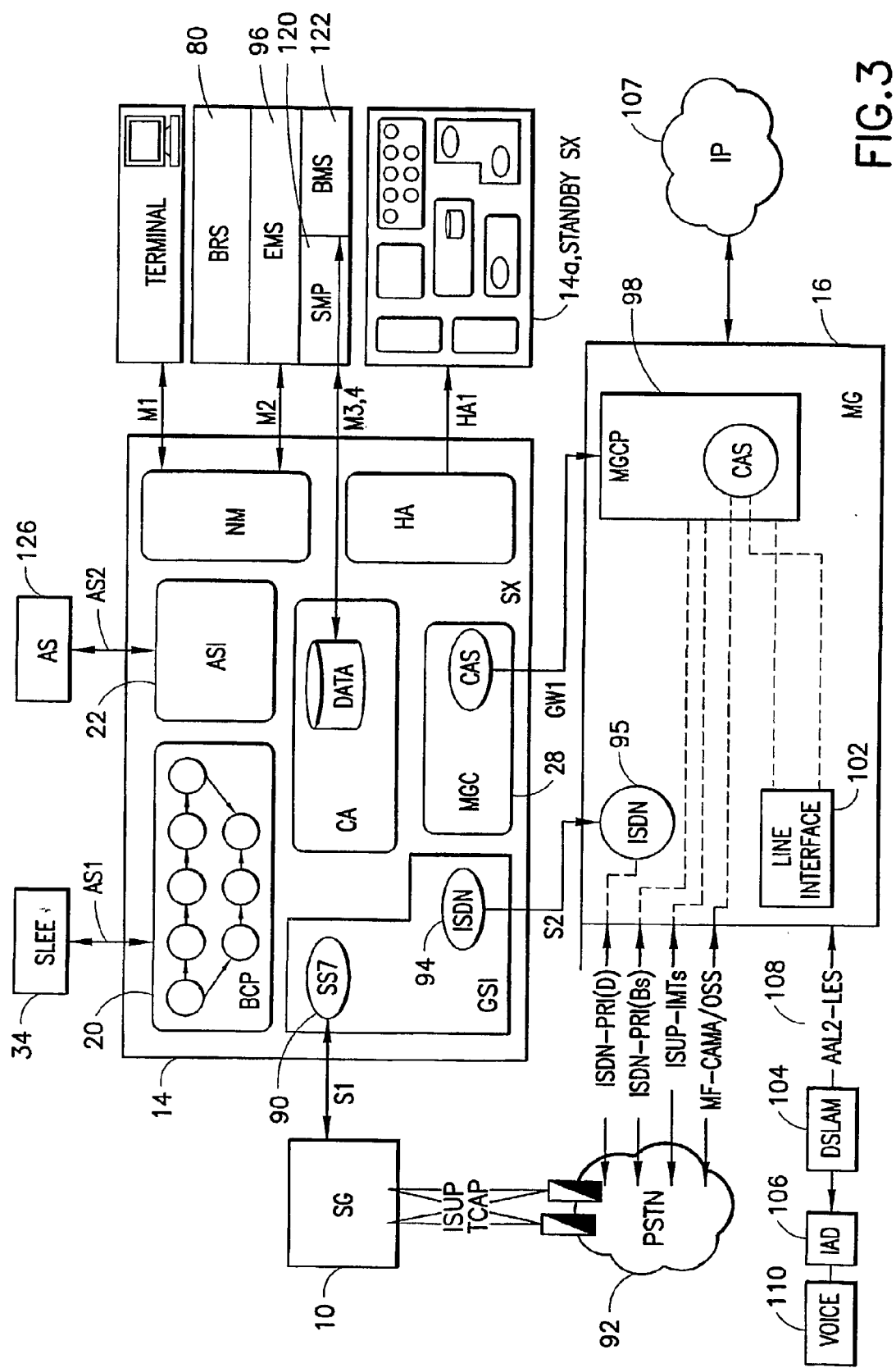
FIG. 3 is a schematic of the interworking of the IP network and PSTN networks according to the invention.

The MG 16 is a broadband switch designed to support switching and interworking between traditional circuit switched network (PSTN) and broadband or "packet-based" networks such as an IP network 107 and an ATM network 108 (FIG. 3). Generally speaking, the media gateway function is to terminate multiple physical or logical 'bearer' channels (typically associated with User connections), and perform inter-working between two or more transport mediums (e.g. TDM, ATM, IP). The media gateway function exists in the media transport plane. As such, the MG 16 includes ports (or endpoints) that when connected create a connection. Each MG has means responsible for switching and interworking (converting signals) between the IP and PSTN networks, and consequently has interfaces for both IP (packet-based) and PSTN (TDM-based) networks.

Figure 2:
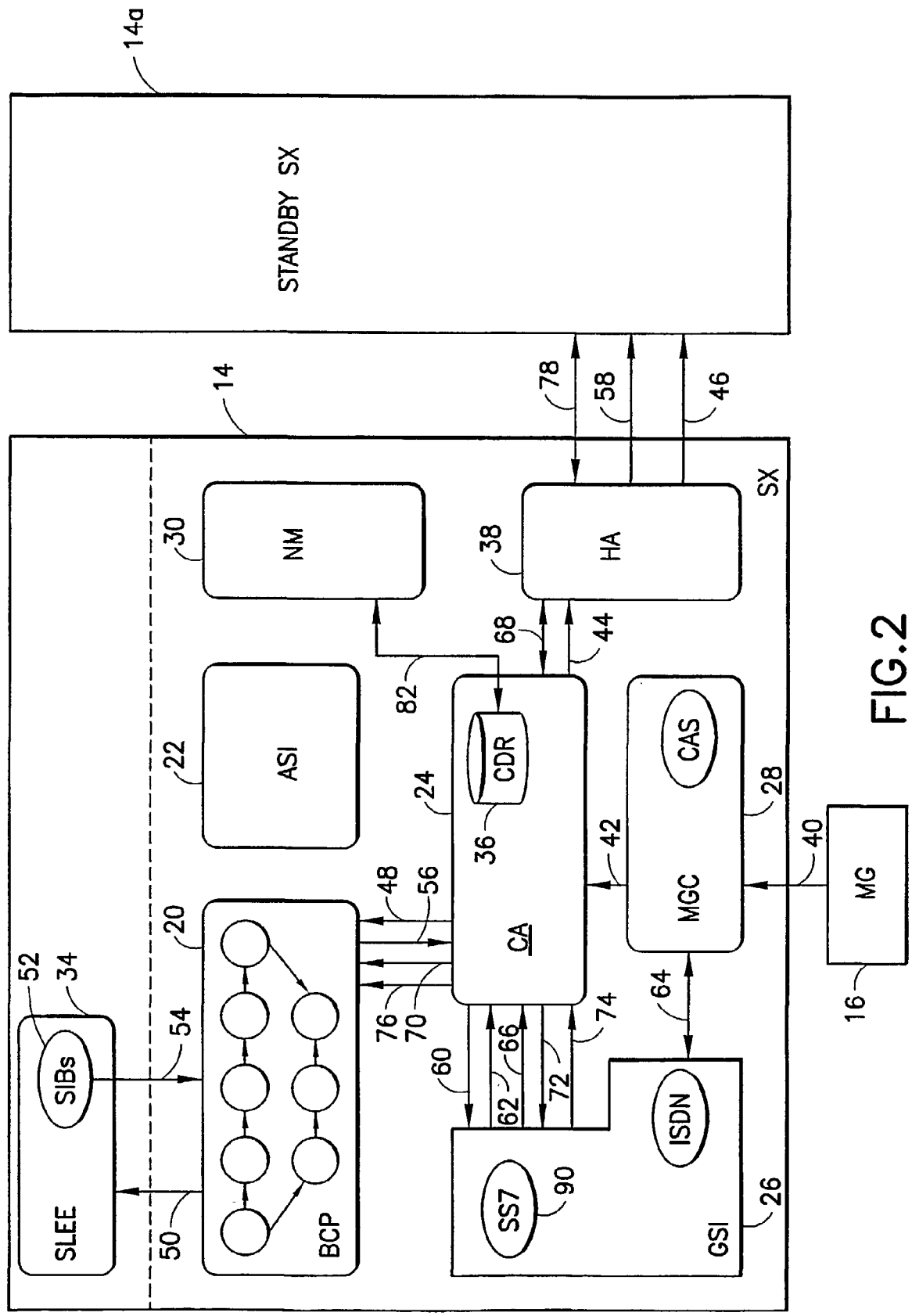
FIG. 2 is a schematic of a service exchange switch (SX) for IP traffic routing and the functionality thereof according to the invention.

Referring to FIG. 2, the SX 14 is generally an integrated services creation softswitch platform which includes connection control, management capability, and the ability to host the basic call process of the SLEE. In this mode, it supports several high-level control domain internal functions: basic call processing (BCP) 20, application services interworking (ASI) 22, call agent (CA) 24, generic signaling interface (GSI) 26, media gateway control MGC) 28, and network management (NM) 30.

According to the invention, the SX 14 also includes carrier-ready modules including Class 5 services, and is an open service creation environment 34 (service level executable environment or SLEE) that enables the rapid delivery of new carrier-class services and enhanced applications. Briefly, the SLEE 34 includes an application programming interface (API) called the SLEE Library which utilizes dynamically loaded shared libraries (DLLs) to facilitate the deployment and distribution of enhanced services which are not subject to the Class 5 delay budget over the integrated network. The basic call processing (BCP) 20 is a specialized ASI function that creates the coupling between the SX 14 and the SLIE 34. The BCP 20 and SLEE 34 intercommunicate using a special command set referred to as the SLEE library, which is described in detail below. The BCP 20 is modeled conceptually on the ITU Advanced Intelligent Network (AIN 0.2) basic call process functions. That is, the BCP 20 uses separate originating and terminating views to express a connection between half-calls. In the BCP 20, a two-party call is viewed as two separate half-calls each with their own connection related data (context) and status (state). The BCP 20 controls all calls in the SX 14 which originate or terminate on a subscriber line. In addition, the BCP 20 also controls all tandem trunk to trunk (AT to AT) calls, which do not require any feature interaction with SLEE 34. In summary, the BCP 20 emulates within the SX 14 all basic call control functions of EO/AT switches currently deployed in the PSTN.

The application services interworking (ASI) function 22 manages the interaction between SX 14 and the application service (AS) functions residing in the service control domain for any non-SLEE AS functions supported by the SX 14. When the SLEE AS functions are implemented, the BCP 20 replaces the thin ASI function 22.

The call agent (CA) 24 is described by its subfunctions, which include: call admission control, call routing, call detail record (CDR) management, and database management. The call admission control determines which application service function (AS) is responsible for controlling an inbound call and selects the appropriate ASI to interface with a particular AS. Each AS must register with an SX 14 prior to receiving work. Call routing uses call related information to perform route table searches and returns one or multiple trunking facilities which may be used for termination. Call routing is described in more detail below. CDR management maintains the integrity of all CDR records in database 36, makes CDR information accessible to other functions in the SX 14 and periodically writes CDR data to disk. Database management maintains the integrity of all local SX database tables, and performs route table synchronization between active and standby SX systems as dynamic updates are submitted through management interfaces. Generally speaking the call agent (CA) function is to coordinate calls and caller related activities and resources. Furthermore, a call agent views a call as a transaction which can include one or many participants. A call agent provides basic call related services to one or many call parties based on their individual service policies. The call agent control function exists in the signaling and control plane.

The generic signaling interface (GSI) function 26 performs common channel control signal interworking between the SX and the network, specifically SS7 and ISDN PRI. The GSI 26 translates raw ISUP, TCAP, AIN, IN and ISDN message structures into generic primitives understood by the SX 14. A generic address structure is used to carry call addressing information between the SX and the SG, e.g. calling party number/sub-address, called party number/sub-address and destination prefix. A generic circuit information structure is used to communicate circuit connection related information between an SX 14 and SG 10, e.g. endpoint type (ISUP trunk group or ISDN access port) and circuit/channel information.

The media gateway controller (MGC) 28 performs interworking between an SX 14 and one or more MGs 16, and provides termination to a collection of endpoints in one or more domains. The MGC 28 translates the connection status (state) and call transaction specific connection information (context), received through an MGC protocol (MGCP), into a generic set of primitives understood by other SX internal functions that may be required to facilitate the call transaction. The MGC 28 is also responsible for managing connections between the SX 14 and MGs 10, including such activities as endpoint audit and fail-over. Generally speaking, the media gateway controller function is to orchestrate and manipulate the connections between two or more physical or logical 'bearer' channels terminating on a single media gateway or terminating between two or more media gateway elements. Furthermore, a media gateway controller may also orchestrate and manipulate the connections between two or more physical or logical 'bearer' channels between a media gateway and a media server(s). The media gateway control function exists in the signaling and control plane.

Network management (NM) 30 includes a number of subfunctions related to network management access control to the SX 14. The subfunctions include configuration session management, alarm interface, database interface, CDR interface, and high availability (HA). The configuration session management controls one or more sessions where a network administrator or a script emulating multiple configuration instructions is submitting configuration updates to the SX 14 using a command line interface (CLI). The SX is preferably run on a Sun Solaris 2.8 platform. The Solstice Enterprise Agents (SEA) from Sun Microsystems provides a software development kit that enables the building of subagents to manage different subsystems, components and applications within a system in Sun Solaris environment. The alarm interface handles alarms as SNMP traps in the SX system. Traps are predefined within each component and, when the trap conditions are met, components call alarm functions within a support manager library to send out SNMP traps. The database interface is synchronized with a subscriber management portal centralized database, e.g., an ORACLE database. The CDR interface maintains all relevant switch and billing information. All records are stored in database 36. The SX MGC/CA host generates raw (unformatted) CDR records for each call from its internal database. CDR data is synchronized between both an active SX system 14 and a standby SX system 14a. As such, should the active SX system 14 become unavailable, the standby SX system 14a is able to take over all existing operations without loss of data. The high availability (HA) function 38 supports redundancy in the event of a failure. As such, the HA function coordinates all internal HA related processes, monitors IP traffic and heartbeat messages over a serial link and two Ethernet interfaces, and determines when to perform failover and recovery functions. When a fail-over needs to occur (due to SX 14 failure), the HA operates to mediate and coordinate fail-over processes between the active SX 14 and standby SX 14a systems. The HA also manages all of the data replication required to maintain all stable calls in the system. The data elements which require replication include CDR records, subscriber profile data, BCP call state information, MIB data (routing tables, IP addresses, etc.), and signaling interface call transaction related data objects in MGC and GSI. At specified intervals, a Billing and Recordkeeping Server (BRS) 80 polls the SX 14 for any new CDR records.

In view of the above described internal functions, a typical call flow through the SX 14 is now described. A notify message 40 from an MG 16 to the MGC 28 in the SX 14 signals a user off-hook event with the user ID (endpoint) and dialed digits attached. The MGC 28 makes the association between the user endpoint ID and a virtual channel (VC) address used internally in SX 14. The MGC-28 then signals the CA 24 on the new call at 42 and the CA creates a call context and a call detail record (CDR) and appends these two objects to the calling VC object. The call context contains all information about the call during its active life and is made accessible to all internal functions of the SX 14. The CA 24 coordinates with the HA function 38 at 44 to provide the status of the calling VC with the appended call context and CDR information to the standby SX 14a at 46. The CA 24 signals the BCP 20 on the new call at 48, providing the BCP with a pointer to the calling VC object and passes control of further call processing of the line to the BCP. The BCP 20 notes the status of the line and checks to see if any service function is required at this stage.

Assuming the SLEE 34 needs to analyze the dialed destination, the BCP 20 uses the current status of the line at 50 to determine which, if any, service function (a service independent building block or SIB as defined by the ITU) 52 in the SLEE needs to be called. If the BCP 20 determines that an SIB needs to be called, the SIB is called and performed on the dialed destination based on the calling party's feature profile. The SIB returns a response to the BCP 20 which then updates the status of the line at 54. The SLEE 34 updates the subscriber profile data putting the dialed destination in the last number dialed field.

Based on the new line status, the BCP 20 signals the CA 24 at 56 to route the call to its destination. The CA 24 performs a route lookup and determines a preferred PSTN trunk group (e.g., ISUP or TCAP) for the call and whether idle capacity is available. The CA 24 coordinates with the HA function 38 to provide the updated status of the calling VC with the appended call context and CDR info to the standby SX 14a at 58.

The CA 24 signals the GSI 26 at 60 to initiate a call to the user dialed destination on the preferred trunk group. Once an idle circuit in the trunk group is selected, its port id is passed back to the CA at 62. The CA then creates a context and CDR for the terminating connection (called VC) and appends these two objects to the called VC object.

During the destination call setup, the GSI 26 and MGC 28 exchange signals at 64 that coordinate the connection activity on the selected trunk group bearer channel with the MG 16.

Once the called party answers, the GSI 26 signals the CA 24 at 66. Now the calling VC and the called VC are connected and the CA 24 updates the BCP 20 at 70. The CA coordinates at 68 with the HA function 38 to provide the updated status of the calling VC/called VC with the appended call context and CDR info to the standby SX 14*a*. The stable call is maintained on an SX fail-over.

The CA 24 signals the BCP 20 at 72 with respect to the connected call, providing the BCP with a pointer to the calling/called VC objects. The BCP 20 notes the status of the line and checks to see if any service function is required at this stage. In this example, it is assumed that the SLEE 34 is not required. The call remains connected until either party hangs up.

Assuming the called party hangs up, the GSI 26 signals the CA 24 at 74 of the release from the network side, which the CA acknowledges, and the CA subsequently notifies the BCP at 76. The CA starts a process every few seconds which writes the CDR data into the database 36. The CA coordinates with the HA function 38 at 78 to provide the updated status of the calling VC/called VC with the appended call context and CDR info to the standby SX 14*a*. This releases the connection resources and generates a CDR in the standby SX 14*a*. On a configurable time interval, the Billing and Recordkeeping Server (BRS) 80 acquires any new CDR records (marked 'unread') from the local database 36 of the SX 14 at 82 (FIGS. 2 and 3).

Referring to FIG. 3, the SX functions map, through interfaces, to other objects, applications, and management terminals in an IP network. The SX interfaces are grouped into the following categories: signaling interfaces S1 and S2, gateway interface GW1, application service interfaces AS1 and AS2, management interfaces M1, M2, M3, M4, and high availability interface HA1.

According to the relationship between non-channel associated signaling (NCAS) data and bearer channels, SX NCAS signaling functions can be divided into two classes: embedded and non-embedded. The embedded signaling function classification means that the signaling channel and the associated bearer channels terminate on the same piece of hardware. For example, in traditional telecommunication equipment, an ISDN D-channel is the 24th channel in a T1 (or the 30th channel in an E1) interface and all the other 23 (or 29) channels are for bearer purpose. Conversely, the non-embedded signaling classification means that the signaling channel and the bearer channels terminate on different hardware equipment, e.g. in the case of SS7 A-links which terminate on dedicated equipment such as a signaling gateway, while the mapped bearer channels terminate on a trunking gateway. Channel associated signaling (CAS) in the SX 14 is a subfunction of the MGC 28.

Signaling interface S1 represents a logical connection between the SS7 non-embedded signaling function 90 of the GSI 26 of the SX 14 and the signaling gateway (SG) 10 used to deliver ISUP, TCAP, IN and AIN protocol-related information. The TCAP/AIN/IN information relates to toll-free number, local number portability, and calling party name database queries.

Figure 4:
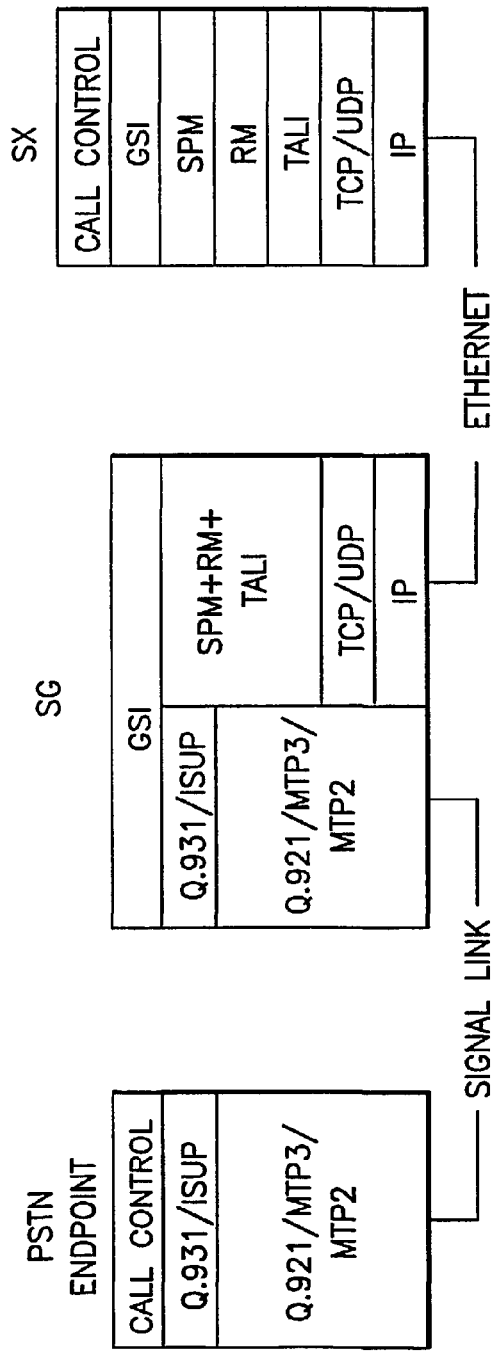
FIG. 4 shows the multilayered SX to SG protocol over the S1 Ethernet signaling interface.

The S1 physical interface is Ethernet over which the multilayered SX to SG protocol shown in FIG. 4 is implemented. In this protocol, the call signaling messages received on the signaling link from a PSTN signaling end point 92 are processed by the Q.931/ISUP stack in the SG 10 and converted into GSI primitives (e.g. connection indication, etc.). The GSI primitives are then sent from the SG 10 to the SX 14 through the Ethernet S1. Several protocol layers are implemented between the SX 14 and the SG 10 to provide reliable and efficient transportation of the GSI primitives. First, a modified version of TALI is used as the transportation layer of the protocol between SX and SG implemented. TALI preferably runs on top of TCP/UDP and IP. TALI is a protocol originally submitted by Tekelec to the IETF to be reviewed for adoption as a standard, but rejected as a standard. A redundancy manager layer runs over TALI, and serves to maintain two mutual-backup connections between the SX 14 and the SG 10. A signaling protocol multiplexing (SPM) layer which multiplexes and demultiplexes native signaling protocols, such as ISDN, ISUP, ATM UNI, etc. runs over the redundancy manager layer. Preferably a backup mechanism is provided in which each SX 14 is coupled via S1 interfaces to a pair of SGs 10. Generally speaking, the signaling gateway (SG) function is to perform inter-working between two or more signaling mediums (e.g. SS7, TCP/IP, etc.). The call agent control function exists in the signaling and control plane. The signaling gateway control function exists in the signaling and control plane.

Figure 5:
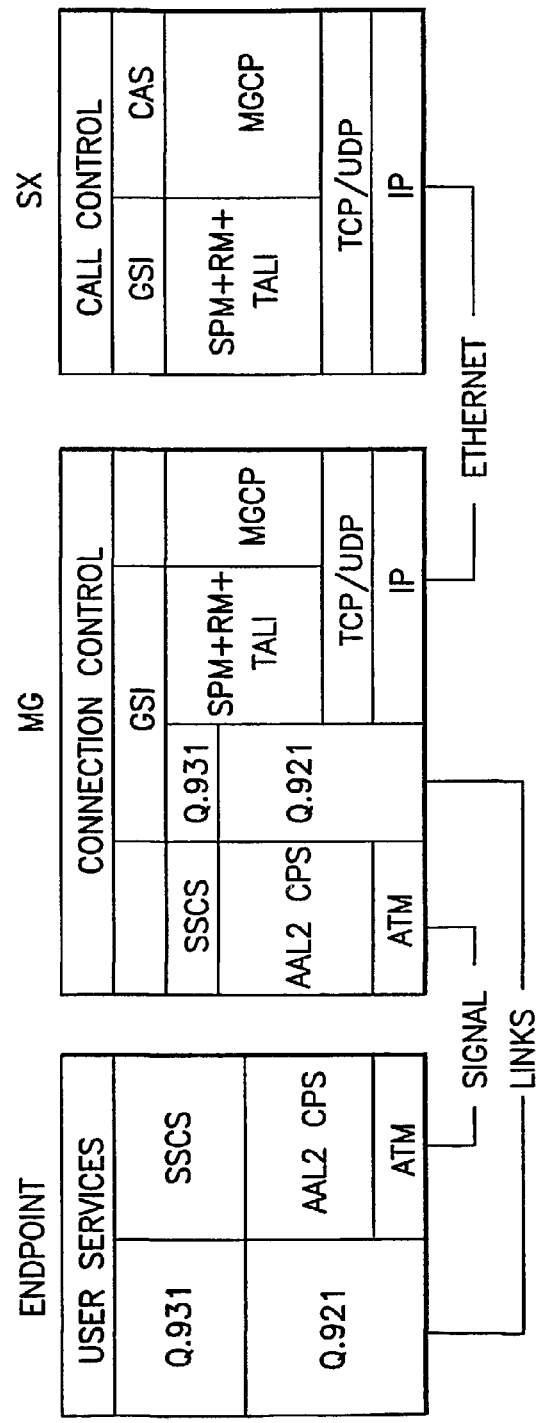
FIG. 5 shows the multilayered MG to SX protocol over the S2 Ethernet signaling interface.

The S2 physical interface represent a logical connection between the ISDN non-embedded signaling function 94 of the GSI 26 and an ISDN endpoint 95 on the MG 16. The S2 physical interface is Ethernet over which the multilayered protocol shown in FIG. 5 is implemented.

With respect to provisioning the signaling information of S1 and S2, a centralized element management station (EMS) 96 of the Billing and Recordkeeping Server (BRS) 80 coordinates the provisioning of the SG 10, SX 14 and MG 16. After EMS provisioning is complete, the SG, SX, and MG coordinate their configurations such that during operation they can correctly map the logical resources in common between them.

The gateway interface (GW1) manages the interconnection of the SX 14 to an MG 16, preferably using the MGCP Version 1.0 protocol. The MGC 28 of the SX 14 implements specific media gateway control protocol (MGCP) packages 98 for line, trunk and channel-associated signaling (CAS) with the MG 16. For CAS, the signals are carried on the same facility as the voice path. Since the MG 16 does not support direct termination of analog interfaces 102, the CAS control to the analog interface 102 is delivered through digital supervision signaling (ABCD bits) over a DSLAM (DSL access multiplexer) 104 to an integrated access device (IAD) 106 using an ATM AAL-2 loop emulation protocol at 108. The IAD 106 is a customer located access device that can handle both voice and data services on the same access line and is connected to a telephone 110 at the customer premises.

The GW1 physical interface is Ethernet over which the IP, user datagram protocol (UDP), and MGCP protocol layers are implemented. In order to facilitate the implementation of redundant MGCs, MGCP uses domain names, rather than IP addresses to identify the MGC and the MG. Several IP addresses can be associated with a domain name. MGCP is a transaction-based protocol, which allows a new MGC function to take over control at any given point of time. When the gateway detects a new MGC source in a new MGCP request, the gateway then sends the associated responses to the new MGC, while responses to previous commands are still transmitted to the original source MGC.

The high availability interfaces (HA1) manage the redundancy between the active and standby SX systems 14, 14*a*. The physical interfaces utilized by the HA1 include four Ethernet connections and one serial connection.

Management interfaces M1 and M2 are for CLI provisioning and element management (EMS), respectively. Both M1 and M2 interfaces are SNMP over UDP. Management interface M3 is used to synchronize subscriber data between the subscriber management portal (SMP) 120 of the Billing and Recordkeeping Server (BRS) 80 and one or more SX systems 14 in the network. Management interface M4 is used to pull CDR records from SX systems 14 to the billing mediation platform (BMS) 122 of the Billing and Recordkeeping Server 80. Both interfaces M3 and M4 are TCP/IP.

The AS1 interface manages the interconnection of the ASI function 22 of the SX 14 to application service functions (AS) 126. The application server (AS) function is to coordinate calls and caller related activities and resources for specialized purposes beyond the basic call process and typically associated with enhanced service arrangements. Furthermore, an application server may provide feature interaction management between application program functions. The application server function exists in the application services plane.

The SX is adapted to support two types of AS interfaces. The first interface type, designated AS1, defines the logical and physical interface between the SX BCP 20 and the SLEE 34. The second interface type, designated AS2, defines the logical and physical interface between the SX ASI 22 and an external AS 126 residing in the IP network. The physical characteristics of the AS1 interface may be implemented two ways, depending on whether or not the SLEE resides on the same server as the SX. When the SLEE 34 and SX 14 reside on separate servers, the AS1 physical interface is Ethernet over which the transport protocol used is UDP over IP. This option requires the network to support IP4 multicasting between nodes, and is implemented by enabling IP multicast routing and IP PIM on all client-server interfaces. The BCP 20 and SLEE 34 communicate through a request/response API referred to as the SLEE Library. When the SLEE and SX reside on the same server, the ASI physical interface is UDP.

Within the SX, connection control primarily involves the signaling and gateway interface functions being coordinated by the call agent function (CA) 24, with call control residing in the basic call process function (BCP) 20. An overview of SX connection control with respect to each interface type is provided in Table 2.

Figure 6:
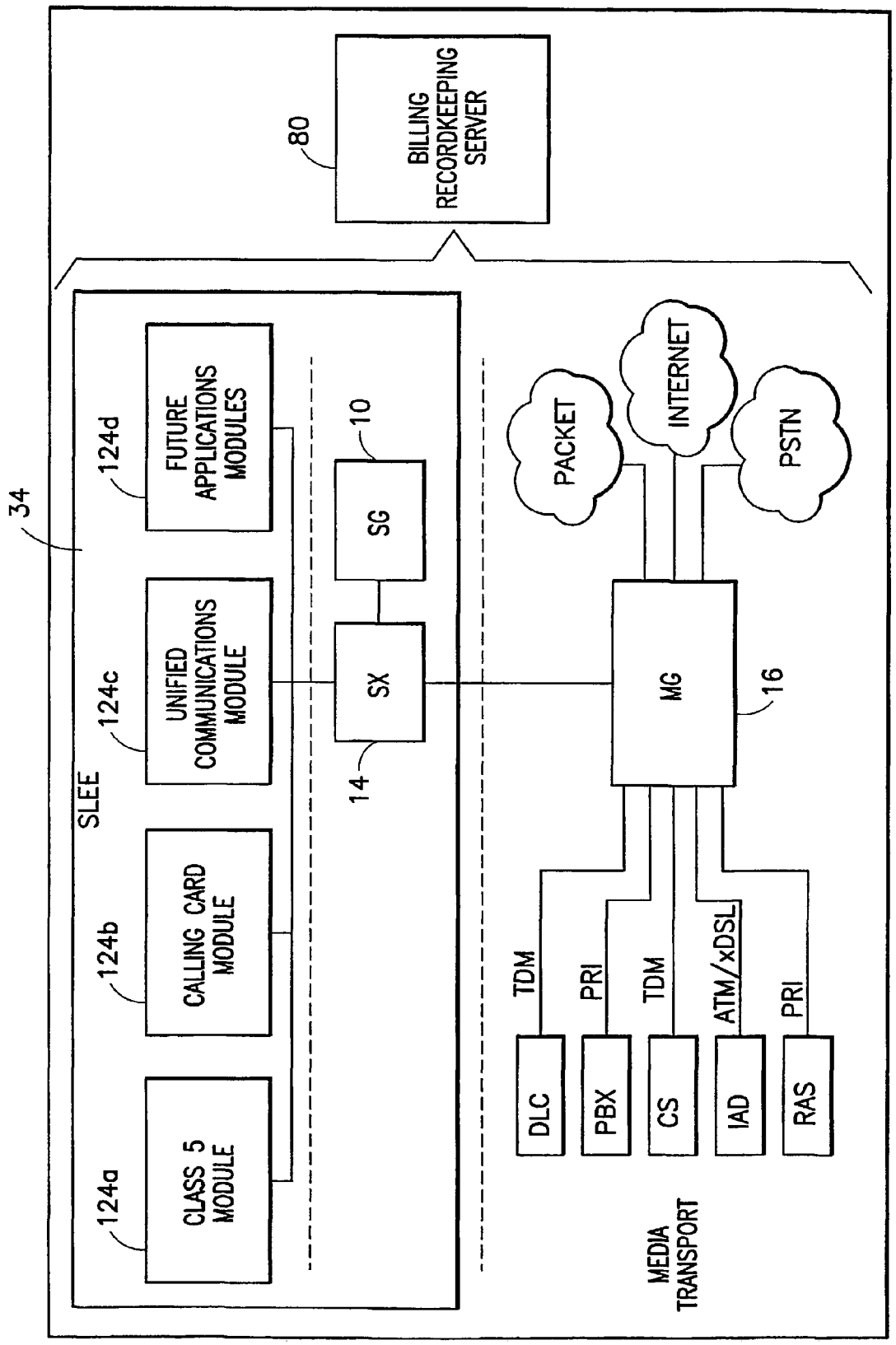
FIG. 6 shows a functional diagram of the interconnectivity of the SG, SX and MG, and the SLEE and Billing and Recordkeeping Server system objects.

FIG. 6 also shows the interconnectivity of the SG 10, the SX 14, the MG 16, the SLEE 34 with modules 124a, 124b, 124c, 124d comprised of SIBS, and the Billing and Recordkeeping Management System 80, albeit providing a different functional overview than FIG. 4. Both figures, used in conjunction with each other, facilitate the understanding of the interconnectivity of objects.

Referring more particularly to the SLEE 34, the SLEE allows for the implementation of many reusable basic application service functions (modules), referred to as service independent building blocks (SIBs) 52. These SIBs may be representative of individual call states, specialized service functions, or the set of atomic functions specified by the ITU for AIN 0.2. Using a call processing language (CPL), discussed below, new SIBs can be scripted which are then combined and compiled into application scripts which execute in the SLEE. Because SIBs contain relatively few lines of programming code they can be easily and quickly tested. SIBs can be reused and combined with newly coded SIBs to create future service applications.

According to one embodiment, the SLEE implementation makes each SIB into a separate process, with user datagram protocol (UDP) as the preferred method of inter-process communication. This makes the implementation completely distributable, driven entirely by the time-to-live attribute of the UDP message, which determines the scope of distribution (e.g., LAN segment, WAN, or world-wide network). As such, new features can be built and tested, and then sent to a customer system by reference in the SLEE Dynamic Naming Services (DNS) server which, as discussed below, permits the distribution of functional elements over the network. Within the SLEE, multiple copies of any SIB can be run as the call load directed to a particular service function or feature peaks. Conversely, distribution of services can also be implemented by having a single SLEE connect to multiple SXs across the IP network. Rather than forcing applications or the SX to learn the details of using the SLEE DNS server, the SLEE Library, referenced above and described in detail below, is provided to make the interface clean and easy.

TABLE 2

SX Internal Interfaces

| Int. Id | Logical Interface | Physical Interface(s) |
|---|---|---|
| Signaling Interfaces (S-Type) | | |
| S1 | SX GSI SS7 to SG | Ethernet |
| S2 | SX GSI ISDN to MG | Ethernet |
| Gateway Interfaces (GW-Type) | | |
| GW1 | SX MGC/CAS to MG | Ethernet; MGCP/UDP/IP |
| High Availability Interfaces | | |
| HA1 | (Sx Active HA to SX Standby HA | Ethernet, Serial |
| Management Interfaces (M-Type) | | |
| M1 | SX NM to Management Terminal | Ethernet, Serial RS-232 |
| M2 | SX NM to Billing and Recordkeeping Server EMS | Ethernet |
| M3 | SX NM to Billing and Recordkeeping Server SMP | Ethernet |
| M4 | SX NM to Billing and Recordkeeping Server BMS | Ethernet |
| Application Server Interfaces (AS-Type) | | |
| AS1 | SX BCP to SLEE (on same server) | |
| | SX BCP to SLEE (on separate servers) | Ethernet; UDP/IP; IP4 Multicast pim dense |
| AS2 | SX ASI to Generic Application Server (AS) | Ethernet; TCP/IP |
| AS3 | SX SMDI to External Voice Mail System | Serial RS-232 |

According to the presently preferred embodiment, the SLEE is instantiated by a C-language program module named slee. The slee executable is a generic implementation of very basic SLEE functions. Consequently, it can run in a variety of environments, wherever service level execution is desired: at the application level, as part of the service creation switch (SX), or embedded within a Media Server (MS) or a similar device. A Media Server generally provides interworking between the SLEE and a media server which preferably supports UTTP. A media server functions to terminate one or many physical or logical 'bearer' channels (typically associated with User connections) into an ephemeral resource (dynamically loaded digital signal processor-attached resource). Furthermore, a media server may mix one or many physical or logical 'bearer' channels into a multi-party conference. A media server is differentiated from a media gateway through its ability to provide enhanced services to a bearer channel (e.g. speech recognition, interactive voice response scripts, text-to-speech, etc.). The media server function exists in the media transport plane. In effect, the media server is the capability layer of the SLEE. The combination of the slee and the libraries, threads, and projects loaded by it make up the actual application. A call flow is implemented within a project.

Figure 7:
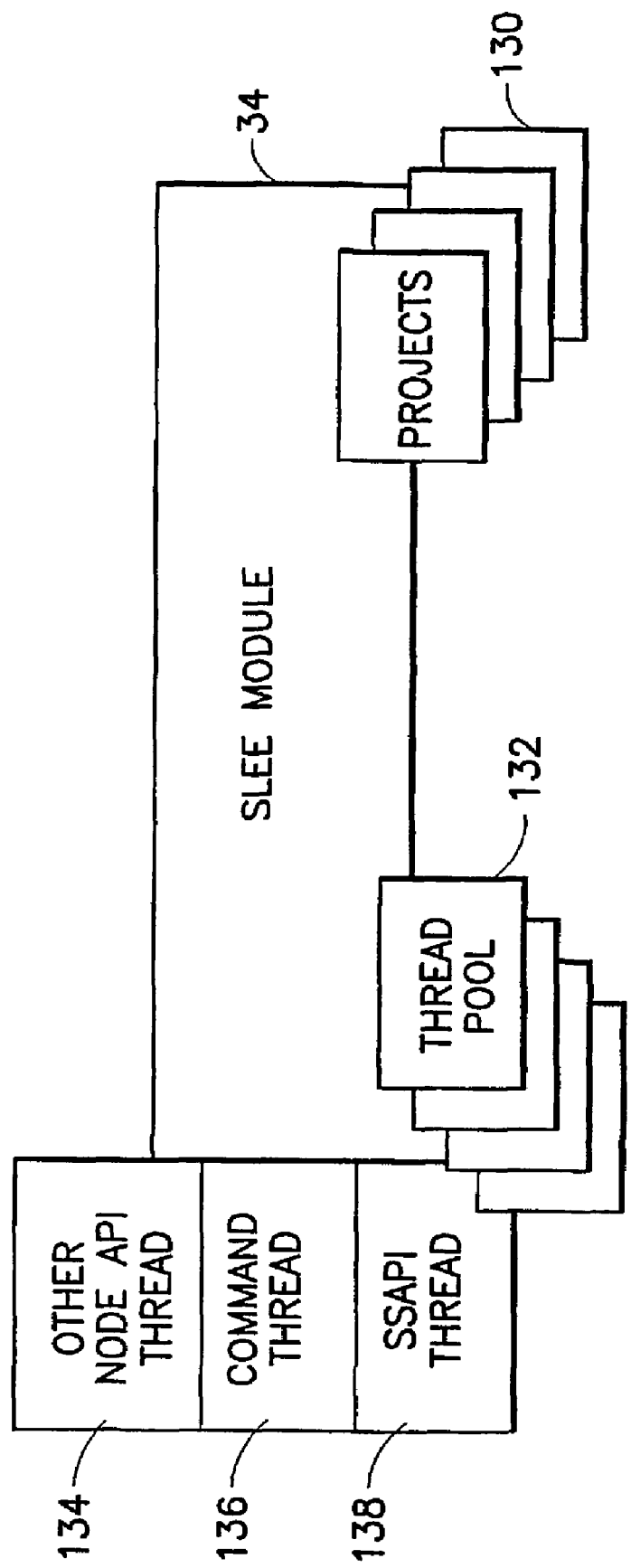
FIG. 7 is a block diagram of the slee and the libraries, threads, and call flows loaded by the SLEE which effect applications for implementing call services.

Referring to FIG. 7, the SLEE 34 is shown with a number of projects 130 loaded in the lower right hand corner, a pool of threads 132 in the lower left hand corner, and three fixed threads 134, 136, 138 along the left side. Fixed thread 134 provides for communication between the SLEE and another node on the network. Fixed thread 136 provides for operator commands to control and monitor the SLEE while it is running. Fixed thread 138 provides for communication with the SX. For each project 130 that the SLEE 34 runs, a thread is retrieved from the thread pool 132, and the thread then runs the project-specific code. The SLEE module provides for balance between the threads that instantiate the projects.

The fixed threads govern a variety of interfaces, one interface per thread and one thread per interface. The fixed threads are written as C-language source modules and linked into the slee at compile time. A configuration file slee.cfg governs which threads are loaded, and the order in which they are loaded. Fixed threads include the following:

opcmds thread (sleecnd.c)

This thread is the command thread, and provides a keyboard interface to the SLEE to allow reconfiguration, shutdown, and similar commands.

sleenode thread (sleenode.c)

This thread allows communication between the SLEE in a subject node and the SLEE in other nodes. This thread also accepts requests from other non-SLEE services to the SLEE (e.g., a request from the notification process that the SLEE make calls to pager bureaus, and to send CDR's for notification events handled by the notification process).

database interface thread (sleedam.c)

This thread waits for database events to occur and forwards these events through the main SLEE thread to the appropriate call flow.

timer thread (sleepuls.c)

This thread tracks the time remaining for an array of script-managed functions. When each timer reaches zero, the call context in informed, and any wait condition pausing the script is interrupted.

Media server thread (sleemm.c)

This thread waits for events from the Media server. When a new event arrives, it is part of SLEE's queue. The SLEE's main thread forwards the event to the appropriate call flow in order that the script handles the information returned by the Media server.

Soft switch API thread (sleerm.c)

This thread manages the API with the Soft switch. When a new event arrives, it is placed on the queue for the slee main thread, which forwards the event to the appropriate call flow.

The various SLEE fixed threads have input and output mechanisms that differ based on the purpose of the thread.

SLEE main thread (slee.c)

This thread services a linked list of queue of events. All the other threads add events to this queue through a function within the main slee thread called slee_addEvent. This thread removes events from its queue and adds them to the linked list queue for the appropriate call flow.

sleecmd thread

This queue removes its input from a UNIX message queue. Its output is typically to a file called /usr2/USM2/LOGS/slee.out.

sleedam thread

This thread gets all new input from the database interface (DBIF) through a call to the function Get_Database_Response. The output is to the slee event queue.

sleepuls thread

This thread has no input. Rather, scripts can initialize one of five function timers through a statement with the syntax:

setContext(funcTimer[x], VALUE)

The funcTimer[0] tracks the number of seconds left before ANM (answer) is returned to the network. The call to set the high limit is setContext(funcTimer[0], thisContext->timer[21])

When this timer expires, the function signalCall (in sleecall.c) causes notification to the thread handling the call in progress that the timer has expired. Threads can test the value of the timer (including when it reaches zero) by checking the value of thisContext->funcTimer[x]. The signal to the thread that the timer has expired will affect any current waits or timed waits.

sleemm thread

The input for this thread is through the function call in mmlib.c named mm_EventGet( ). The mmlib code manages TCP/IP socket connections to the various Media server servers. Output is to the slee main event queue.

sleerm thread

Input to this thread is through the TCP/IP socket connection that underlies the open API. Output is to the slee main event queue.

Figure 8:
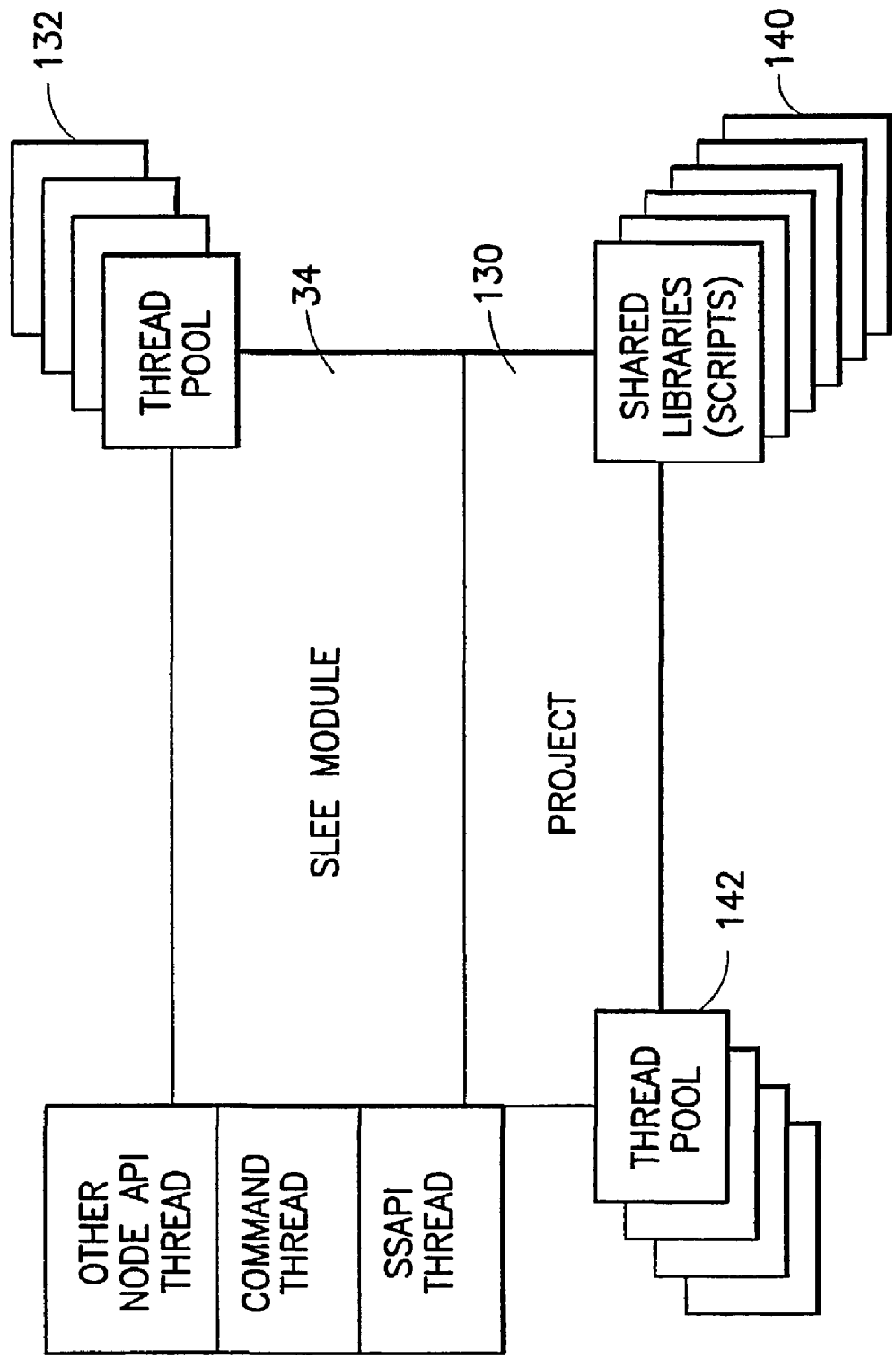
FIG. 8 is a block diagram of a single project state machine run within the SLEE.

Referring to FIG. 8, the project state machine contains the logic that implements a project 130. Each project 130 can have a different state machine that governs the meaning of events at a finer level than the call states. Each project state machine 140 is a shared library loaded by the slee module, and pulls messages off of a linked list created by the slee module and processes each as a separate event. The state machine tracks the context of each event and the result of each event handler (script).

The logic that handles each event is written in scripts in a call processing language (CPL), and then compiled into dynamically loaded shared libraries (DLLs). Each state machine 140 governs a pool 142 of threads that handle active calls. The threads make calls to the shared libraries, to the state machine, and to the slee module.

The slee module is invoked as a separate process at the application layer with a parameter that indicates the level at which it implements the SLEE, as follows:

SLEE/BIN/slee AP to run at the application level

The slee is run within its own thread in the Soft switch (if it runs there) and in the Media server. The entry point is a routine named slee( ), which takes two parameters: the level at which it is running, and the path to the configuration information:

int slee ("SS", path); to run within the Soft switch int slee ("MS", path); to run within the Media server The return code indicates whether the SLEE was able to initialize (0) or not (some negative value). All of the calls to MS devices that use device drivers that are not thread safe, are through calls back through the slee thread, which may in turn call routines in the module that launches it. It is necessary for the slee to know at which layer it is operating because, depending on the layer, different scripts are loaded.

Also in the SLEE directories are the dynamically loaded shared libraries (DLLs) that provide the API between the layers. In the case of the AP directory, there is a DLL that provides inter-node communication services; e.g., Access Node to Service Node, Guaranteed Delivery, etc. The shared libraries also provide basic services such as trace file logging, alarm and trap notifications, etc. The shared libraries are preferably compiled for the specific operating system in which they run.

The slee module loads the unique processing logic (project state machines) for the various projects, and receives the run-time commands discussed below.

The application layer slee has several functions. First, the application layer slee module receives all messages from the SS through the selected API, e.g., an interface such as PARLAY™ (from the Parlay Group) and S-100. The received message is then added to the appropriate linked list for the project that the message pertains to, and the project is notified to handle the message. Second, the application layer slee module is also responsible for communicating with other layers. Third, the application layer slee module controls connections to other nodes like Access Node to Service Node, the Guaranteed Message Delivery system, and the database. Fourth, the application layer slee module loads the node configuration details and makes them available to the various project state machines.

According to the preferred embodiment, the slee module is preferably not loaded in the Soft switch (SS) layer. However, given an appropriate function, the slee module may be loaded in the SS layer.

In the Media server, the slee is responsible for loading specific project logic where necessary.

By way of example, the following high level pseudo-code for implementation of the slee module is provided:

Confirm that the Layer parameter is one of AP or SS or MS.

Load the configuration file slee.cfg.

For each shared library listed in the slee.cfg file,

Load the shared library from /SLEE/BIN/Layer.

If the file is missing, generate an alarm and shut down gracefully.

If application layer, load the node parameters such as native language, node address, and address of the nearest Service Node.

For each project subdirectory in /SLEE/BIN/Projects/Active:

Launch the state machine for the project as a separate thread, passing the Layer parameter and the node configuration information.

Create a thread scheduling pattern that will round-robin through the projects when scheduling control is necessary.

Do until stopped:

Receive messages from other layers.

Add the message to the proper linked list for the project. The project is determined from the combination of span, channel, and node received on each message from the Soft switch.

Signal the project thread that a message was added to its list.

Each slee module has a control thread that reads a message queue for run time commands that can be entered at a keyboard. A separate module named tellslee knows how to communicate with the command thread through the message queue, and an operator can send messages directly to the slee module to affect how it runs. Commands all have a prefix that can be tested (e.g., "!!") and then one of a series of standard commands:

SHUTDOWN: gracefully shut down all the projects and the slee module itself.

KILL #: gracefully shut down a single project (whose ID is given in #) if possible, if not possible to cause a graceful shutdown, force an ungraceful shut down.

KILL ALL: gracefully shut down all projects.

TRACELVL #: set the trace level to the number indicated by the digit '#'.

LOAD: load or reload a project state machine or a shared library.

SHOWCFG: display a list of the currently running projects, and other tables and global variables to a file in /tmp for inspection.

SHOWLIST #: show the messages stored on linked list '#'.

SHOWLIST ALL: show the messages stored on all of the linked lists.

THREADS: show a list of all of the threads.

CANCEL #: cancel thread number # in the list.

CANCEL ALL: cancel all threads in the list

As discussed above, the slee module launches the project state machine appropriate to the state machine's level of execution, AP (Application), SS (Soft switch), or MS (Media server). The files that control the project state machines and the compiled scripts are contained in directories designated for the level of execution:

/usr/SLEE/BIN/Projects/Active/ProjectName/AP

/usr/SLEE/BIN/Projects/Active/ProjectName/SS

/usr/SLEE/BIN/Projects/Active/ProjectNane/MS

In addition to the Active directory, there is a directory named Inactive:

/usr/SLEE/BIN/Projects/Inactive/ProjectName/AP

/usr/SLEE/BIN/Projects/Inactive/ProjectNwne/SS

/usr/SLEE/BIN/Projects/Inactive/ProjectName/MS

The Inactive directory is used to store test configurations or new projects while they are being uploaded to the node. Projects that are being decommissioned can also be moved into this directory. The directory can also hold reserve copies of previous versions of a project in case a roll back to a previous version is necessary.

Each of the Active and Inactive directories contain a file named inventory that names all of the scripts that should be loaded by the project state machine.

A separate thread handles each event for a call. The threads make calls to the shared libraries, to the state machine, and to the slee module. When the thread completes its handling of the event (that is, when the script is completed), the thread is returned to the thread pool.

The transitions in the call states are the responsibility of the project state machine in the application layer and its interface to persistent call objects. Therefore, SLEE elements in the Soft switch and the Media server must trigger events in the application layer to effect the changes in the call's call state.

An unexpected release of the call by the caller will generate an event that will cause the Soft switch to broadcast an asynchronous release event to the application and the Media server.

By way of example, the following high level pseudo-code for implementation of the project state machine is provided:
Confirm that the Layer parameter is one of AP or SS or MS.
Read the project global configuration variables from the database.
Load the file /usr/SLEE/BIN/Projects/Active/ProjectName/Layer/inventory.
For each file in the inventory,
Load the script.
Create a thread scheduling pattern that will round-robin through the projects when scheduling control is necessary
Receive messages from the slee.
Get a thread from the pool (or create a new thread) to handle the message.

Each project state machine also has a control thread that reads a message queue for run time commands that can be entered at a keyboard. A separate module named tellproj knows how to communicate the command thread through the message queue, and an operator can send the messages or commands described above (SHUTDOWN, KILL#, TRACELVL, etc.) directly to the slee module to affect how it runs.

The inner workings of the SLEE can be monitored real time with the following command: display.sh. The results are written to slee.out.

The command to show the names of scripts as they execute is:
tail -f slee.log|grep AP_
The command to display the names of prompts as they play is:
tail -f slee.log|grep V9
The command to be able to see each Soft switch event as it arrives is:
tail -f slee.log|egrep "sw_|Rm"
The command to view the results of Media server functions as they are reported to the SLEE is:
tail -f slee.log|grep "API="
The command to see whether the SLEE is receiving calls is:
tail -f slee.log
The command to change the ISP service addresses while the SLEE is running is:
tellslee ISP 0=phone_number Callflow
The current settings of an ISP modem can be viewed by either:
tellslee showisp Callflow
tail slee.out or:
cat isp.cfg Call Processing Language As mentioned, the call processing language (CPL) is used to create scripts for the SLEE. A script, as briefly described above, is an event handler or a system independent building block (SIB), either high-level or low-level. Since events of telephony significance can take place on all layers of the OSI stack, the CPL does not limit itself to the Application Layer. Instead, CPL scripts can be executed in a variety of environments. The first layering scheme separates the functionality of the application logic from the Soft switch and the Media server.

Each call is represented in the application layer by a persistent call object "owned" by the application layer that maintains a number of items relevant to a call. "Ownership" means responsibility to maintain the "call state". Since the application layer "owns" the call object, changes to the call object are made only through the application layer scripts. Scripts at other layers have to generate ("trigger") application events to change information in the call object. The call object contains the subscriber profile data, the cumulating CDR data, and the application state of the call besides the call state. The application state is a variable that tracks the most recently handled event and the event next expected.

"Call state" means the state of the call in the sense described in the documentation for PARLAY™ or some similar standard application server. Whenever an event in any layer would change the call state, an application layer event must be triggered so that the application layer will change the call state within the persistent call object.

As a call progresses, parts of the persistent call object are sent between the application layer and the layers lower in the OSI stack, and possibly back up to the application layer. The result is that each call is controlled by the application layer.

According to a preferred embodiment, scripts written in CPL are compiled into C-language statements, which are then compiled into shared libraries by a standard C compiler for the target computer. The compiler is made up of a specification preferably developed with the C code yacc command, a parser preferably developed with the C code lex command, and preferably a number of C code and header files. Once a script is written, the command to generate C code from the script is cpl SCRIPTNAME.cp. The output is a file named SCRIPTNAME.c. The C code is then compiled into a shared library according to the specifications of the target platform. The importance of implementing the scripts as shared libraries is that scripts can be dynamically loaded; even at run time, a command can be issued to load a new copy of a script. Any new calls made will use the newly loaded version. The command interface for loading the new version of a script as a dynamically linked library is described above. On the Linux operating system, it may be necessary to link the scripts together into a single large linked library that represents a whole call flow. The call flow can be changed during run time as described above, but it is not possible to change individual scripts at run time.

The scripts for the CPL are written as plain ASCII files with new-line delimiters. Scripts are composed of sections. Some sections are required, and other sections are optional and appear only when required by the script.

Scripts can request the execution of other scripts, either at the same layer of execution, or at other layers. "Run" or "jump" are the two possible commands when a script executes another script within the same layer; that is, if an application script runs an application script). The command "run" is used if the original script expects to continue running after the other script has begun executing (synchronously, like a subroutine call). The syntax is run SCRIPT (parameters); for example, run AP_MainMenu(thisContext).

The command "jump" is used if the original script is now funished and the other script will complete what the original script might have done (asynchronously, like fork and exec). The syntax is jump SCRIPT(parameters); for example, jump AP_VoiceRoute(thisContext).

For instance, if there is a script that has been written to prompt a user with a question that will elicit a "yes" or "no" response (MS_Yesno), when another MS script wants to ask the user a yes or no question, the original script can "run" the MS_Yesno script. If there is a script that plays a "Goodbye" message and hangs up on the caller (AP_Bye), any AP script that wants to hang up on the user in that fashion would "jump" to the AP_Bye script.

A script can run another script in the background. The second script runs (in part) in parallel with the first script. The second script is called the "child" script, and the original script is called the "parent" script. The child script inherits certain features from the parent, including the call reference number that will tie CDR's produced by the child with the CDR's created by the parent. The syntax is: bgrun SCRIPT (parameters); for example, bgrun AP_PrintFax(faxFileName,destination, "FAX", removeflg)

If a script running in one layer wants another layer to execute a script, it will "trigger" the running of the script with the command <LAYER>_trigger, where <LAYER> will be:

MS for Media server,
 SS for Soft switch, and
 AP for application.

Scripts being run by the Soft switch or the Media server are preferably not allowed to span changes in the call state. Such changes are preferably required to be requested at the application level, where the call states are tracked.

A script itself is delimited by the "start script" and "end script" key words. As such, the first non-comment or blank line must contain only the key words "start script" and a new line character. The last non-blank and non-comment line must contain only the key words "end script" and a new line character. Incorrectly formatted key words are ignored. Hence, required key words incorrectly formatted will be flagged as absent, and the script will not compile.

Scripts return a value of "SUCCESS" or "FAILURE." The return value signals to the requesting layer whether the values in the interface buffers are of any value. A return of FAILURE would indicate that the contents of the interface buffers are undefined. A return of OK would indicate that the contents are set as expected. Returns are coded within the then or else section with the keyword RETURN plus SUCCESS or FAILURE. Actually, the "SUCCESS" keyword is translated into (void *) thisCall, where "thisCall" is the address of the call object, and the "FAILURE" keyword is translated to (void *)NULL.

Comment lines begin with a hash ('#') in the first position. Comments are allowed anywhere within a script, including before the "start script" and after the "end script" keywords. Blank lines; that is, lines consisting only of white space and a new line, are allowed at any point.

The header and code sections, described individually hereafter, are required to be in all scripts. The ibuffer (input buffers), obuffer (output buffers), prompts, and counters sections, also described hereafter, are optional, and their absence is not considered to be an error unless reference is made to them.

The header section begins with a line consisting of only the keywords "start header" and a new line and ends with a line consisting of only the keywords "end header" and a new line. Each field within the header consists of a keyword plus white space (any number of tabs or spaces) plus a value. The header must include required fields, and may include optional fields.

The following fields must appear in the header, and in the following sequence. ScriptName VALUE VALUE must start with:

MS for Media server,
 SS for Soft switch, or
 AP for Application.

The two-letter prefix is followed by an underline, and then any alpha-numeric characters. Preferably, scripts are named so that their purpose can be determined from the name. Example: MS_NewCall.

ProjectNo VALUE VALUE must be numeric.

Example: 62357.

ProjectName VALUE VALUE is the overall (meta-) project
 For example: ProjectA.

CreationDateVALUE VALUE is the date that the script was created, in ISO-8601 format.

Ex: Mar. 16, 2000 appears as "2000-03-16."

ExecutedBy VALUE VALUE shows which layer executes the script. Valid choices are:

MS for Media server,
 SS for Soft switch, and
 AP for application.

Release VALUE VALUE is a description of the release of the CPL that the script is intended for.

Customer VALUE VALUE describes the customer for whom the application is designed. The VALUE can consist of more than one word.

Application VALUE VALUE is the name given by the customer to the application that the script pertains to. For example, R******. The VALUE can consist of more than one word.

The following fields are optional and only appear if necessary:

UpdatedBy VALUE VALUE has the name of the person who last edited the script. For example, DFreedman or David Freedman.

UpdatedOn VALUE VALUE holds the date and time that the script was updated, in ISO-8601 format. For example, 8:53 PM of Mar. 16, 2000 appears as in this field as 2000-03-16 20:53.

An "input buffer" (ibuffer) is a buffer with data (input parameters) that is provided by the level that calls the script. An ibuffer, when present, begins with a line that has the words "start ibuffer" and a new line, and ends with a line that has the words "end ibuffer" and a new line. The ibuffer section can contain up to five buffers. Each ibuffer description consists of the name of the buffer and the size of the buffer in bytes.

When the ibuffer section compiles, the name of each buffer becomes:

char *buffername;

The pointer points to a field, thisContext->parms[x].value, where x is a number between 0 and 4.

An example of an ibuffer is

```
start ibuffer
    profile 8
    project 32
end ibuffer
```

An obuffer section declares the buffers necessary during the execution of the script. The compiler executes a malloc( ) call for each obuffer, using the size of the buffer as a parameter. Buffer names have script scope. An obuffer section, if present, begins with a line that has the words "start obuffer" and a new line, and ends with a line that has the words "end obuffer" and a new line. The obuffer section can contain any number of buffers. The script refers to the buffers by name. Each obuffer description consists of the following and the size of the buffer to reserve. An example of an obuffer is:

```
start obuffer
    account 16
    callerName 128
    callerMsg 128
end obuffer
```

The prompts section is optional and is present only if the script will play prompts. The prompts section begins with a line with the keywords "start prompts" and a new line, and the section ends with a line that has the keywords "end prompts" and a new line. The VOX file is established by the keyword language discussed below. The individual prompts are listed in a two-part line, with the actual VOX-prompt name (up to 12-bytes), followed by an optional description. An example of a prompts section is:

start prompts
   V900111 Welcome to Platform
   V920611 Please Enter Last digits of your account
   V920411 Sorry Not Valid account number
   V900411 Sorry this account is temporarily closed
end prompts The optional counters section is a list of script counters that can govern script flow. The section begins with a line that has the keywords "start counters" and a new line, and it ends with a line that has the keywords "end counters" and a new line. The counters themselves are declared a name; for example, "retries." Within the script code, the counters are referred to by their names. For example, given the declaration "retries", to increment the counter "retries" the script code would be "retries +1." Counter names have script scope.

The code section is required and contains what the script actually does. The code section begins with a line with the key words "start code" and a new line, and ends with a line that contains the key words "end code" and a new line. Each line of code can have the following elements, and only in the order specified.

The code section can have an optional code label field. The labels can be numbers or names. Name labels begin at the first position on the line with a colon, followed by label's name, as in :CLI_Blacklisted.

The code section can also have a keyword language. If a prompt is to be played, the keyword language followed by a valid choice sets the language in which prompts (VOX files) are to be played. The valid choices for the language keyword are the "native" and "subscriber". The keyword "native" identifies the native language of the node or DNS on which the script is running. The keyword "subscriber" identifies the language selected by the subscriber in which to hear prompts.

If a prompt is to be played, the keyword prompt is followed by the name of the prompt selected from the list of prompts in the prompts section of the script:
   Vnnnnnn means a prompt from a VOX file (the VOX file is specified by the language statement)
   A digit string means to recite the number with allowances for language variants
   A var name The syntax is then:
   prompt({promptName1;promptName2;variableName, smartMode;
   "digitString", smartMode; . . . }, timer, digitsToGet, trapMask), where the content between { and } is what is played to the caller, timer is the index of the timer in the timer array that is the max time for input collection referred to as Tnumber (for example, "T22"), digitsToGet is the maximum number of digits to get from the caller, and trapMask is a double-quote delimited string of zeroes and ones that turn up trap detection on ('1') or off ('0'). "Traps" are termination conditions that can end input collection. Traps include:
   MAXWAITTIME Maximum initial silence
   IDDTIME Inter digit silence timer
   STAR The star key (*) was pressed
   POUND The pound key (#) was pressed
   MAXSIL Maximum silence was detected
   MAXTIME Maximum functional time
   TONE An expected tone was detected The material between { and } need not appear in any specific sequence. Each item, except the last, ends with a semicolon.
   promptName1: Name of a prompt
   promptName2: A script can store a prompt name in an obuffer variable and request playing the prompt Two reasons for grouping prompt names is that the termination condition will stop all of the output in the statement. That is, if the POUND trap is on and the caller presses '#' during the playing of promptName1, all output will stop and the SLEE will resume on the next line of script.
   variableName, smartMode:
   The request is to play the digits contained in the script obuffer named variableName. The smartMode flag tells the Media server how to group the digits. The current values are:
   MS_SMARTNUM_NAMED_PROMPT=0
      treat the string as a prompt ID.
   MS_SMARTNUM_SPEAK_ONE_DIGIT=1
      speak each digit, one at a time.
   MS_SMARTNUM_SPEAK_TRIPLETS=2
      recite the digits in groups of three.
   MS_SMARTNUM_SPEAK_HUNDREDS=3
      plays the digits four at a time.
   MS_SMARTNUM_SPEAK_AND_TRIPLETS=4
      plays digits 3 at a time, uses "and" and "hundreds".
   MS_SMARTNUM_SPEAK_AND_HUNDREDS=5
      plays the digits four at a time, uses "and", and "hundreds".
   "digitString", smartMode
   Plays a specific digit string enclosed in double-quotes using smartMode as above.

If a built-in routine is to be called, the keyword execute appears followed by the name of a built-in routine to execute and its parameters. The parameters to the routines follow the name of the routine in parentheses; for example, "DTMF (parm1, parm2, . . . , parmN, trapMask)".

The trapMask field is a bit-map of events or "traps" known to the subroutine. Each trap is a termination condition. If the routine understands eight traps, the trapMask can be thought of as an 8-toggle switch. If all 8 bits are off, the toggle looks like this: 00000000. If the script wants to know that the second trap happens (or "fires"), the trapMask would look like this: 01000000. In other words, the bits are numbered from the left, beginning with 1. To instruct the script to behave a certain way if the trap fires, the script author writes a sequence line with the notation:

if (trap2) then . . . else . . .

The else is optional. The notations become clearer in view of the following discussions of the keywords if, then, and else. The built-in routines will return if any of the traps is set in the trapMask and the situation trapped becomes true. If the script has execute DTMF( ) with the trapMask enabling any of those traps, and during the course of the execution of the DTMF function one of the enabled situations happens, the built-in routine will return execution to the script with a return code that indicates what trap occurred. A script statement containing the keyword if followed by the condition in parentheses that matches the trap will change the flow of execution appropriately. For example, if DTMF was called and the trapMask was 00100000, it would mean that the script author wanted to trap only the situation of maximum number of digits pressed. Preferably, the following line is provided in the script:

if (trap3) then LABEL or, if there is need for an else clause (typically the last trap in a series):

if (trap3) then LABELm else LABELn

If present, the trapMask is the last parameter.

An operation consists of a counter, an arithmetic operator (e.g., plus or minus) and an optional operand. A counter can be referred to by its name in the counter section in the script header. Counters are initialized to zero by default. The valid operations on a counter are shown below. Note that there is a space between the counter and the operator, and no space between the operator and the operand.

counter=VALUE
counter+VALUE
counter−VALUE
counter*VALUE
counter/VALUE

The if keyword followed by a condition in parentheses is optional. For example:

if (account=="") then TwoStars states that if the buffer named "account" has the value "" (begins with two stars), then continue at the label TwoStars. The expression between the parentheses "(account=="**")" is called a condition. If there is any other value in the "account" buffer, continue at the next line of the script. Every if statement must be followed by a condition and a then statement. The else is optional, and will only be present if it makes sense. Note that a trap that has fired is treated like a condition, and one can say "if (trap2) then . . . ".

The valid operators are:
<"less than" for arithmetic comparisons
<="less than or equal to" for arithmetic comparisons
="equal to," both for arithmetic and string comparisons
>"greater than" for arithmetic comparisons
>="greater than or equal to" for arithmetic comparisons If there is no if or else clause in a line of code, the default is to continue on the following line of the script.

In order to facilitate understanding of the CPL, the following sample script is provided:

```
# This script is a subroutine that plays the owner's Status
    Messages

# Reference: ABCSample Service Logic
# Unified Messaging High Level Voice Menu Structure

start script
start header
ScriptName: AP_MailboxLimit
ProjectNo: 2001
ProjectName: XYZProject
CreationDate: 2001-02-09
ExecutedBy: AP
Release: A
Customer: ABC
Application: Sample
UpdatedBy: John Q. Smith
UpdatedOn: 2000-03-02 12:00
end header
# no ibuffers
#start obuffer
#end obuffer
#start counters
#end counters
start prompts
    V903511 Warning, your mailbox is full.
end prompts
start code

# Mailbox usage >=100%. This message is NOT interruptible.

# Warning, your mailbox is full.
    cpl({V903511},0 ,0, "")
    waitfor PROMPT_COMPLETE
    return SUCCESS
end code
end script
```

SLEE Domain Name Service (sleedns)

In accord with a preferred aspect of the invention, a Dynamic Naming Service (DNS) for the SLEE is provided. The sleedns permits service to be distributed over multiple segments in a network.

The sleedns module starts early in the IPL sequence of an application service. It accepts requests over UDP on a defined port. When applications or application elements open their own ports for listening, the library function that performs the socket and bind commands sends a UDP registration request to the local sleedns process. The message contains the name of the element, the hostname of its host, the IP address of the host, and the port that the element listens on. Application elements that want to send to another application element issue commands in the format:

sendTo("elementName," messagePointer, sizeof message);

The sendTo function has the responsibility to query the sleedns to look up the host, IP address, and port for the named element, and to send the UDP message to that port on that host. The sendTo function keeps a table of recently used addresses so that it is not necessary to do a sleedns look up for each message. The table contains all the occurrences of the named element, and the local server gives precedence to the local server, but is capable of sending messages in a round-robin fashion to other hosts.

If a processing element is over-burdened, it preferably deregisters with its local sleedns, and the local copy bears the responsibility to update all the network copies. Thus, the application element is no longer in sight. It is the responsibility of the local copy of sleedns to remain synchronized with the other network copies. This can be accomplished by sending multicast messages to all listeners in the network on the sleedns port.

A number of predefined messages are known to the server. All messages to and from the sleedns are preferably in Session Description Protocol (SDP) or XML format, and some (indicated below) have responses associated with them. If a response is not received before the expiration of the timer (configured in a configuration file), the request is repeated.

An application element registers that is ready to receive messages. The registration is done at initialization. The local sleedns is responsible to multicast the new location to all the other sleedns servers in the network. Each registration is stored with the time of its receipt. If the application element is already registered, the entry in the DNS is updated with the new time, and success is returned.

The Session Description Protocol (SDP) request to register an application element consists of the fields shown in Table 3. A semicolon separates fields from each other, and the order of the fields is not important. An example registration request would look like:

r=ST4;p=20806

TABLE 3

SDP Registration Request Fields

| Field | Required | Comments | From the Example |
|---|---|---|---|
| r = ElementName | Required | ElementName can be a maximum of 31 bytes. | "ST4" is short for "State4." There is enough room to be clear about the name, as in "ST_Alerting." |
| p = port | Required | In network byte order | "20806" is how the network byte order for 18001 is reported by Linux on Intel x86's. |
| h = Hostname | Optional | Maximum size of NI_MAXHOST-1 (1023). | |
| i = HostTCPaddress | Optional | In IPv4 dot notation. | |

The reply is the request, with a new result field, and the optional Hostname and HostTCPaddress fields supplied. The reply to the example request is in the following format:

k=ACK;r=ST4;s=r;h=cpci_1.techcontrol.com; i=10.4.1.32;p=20806

If the request is rejected (for any reason), the response is in the following format:

k=NAK|reason;r=ST4;s=r;h=cpci_1.techcontrol.com; i=10.4.1.32;p=20806, with the fields identified in Table 4.

TABLE 4

SDP Registration Request Fields

| Field | Required | Comments | From the Example |
|---|---|---|---|
| k = ACK | | | |
| k = NAK|reason | ACK or NAK is required, the reason is optional | Supplied by the DNS server. | Note that if a NAK has a reason, there is a vertical bar between the word "NAK" and the reason, which could be several words, such as "no room in table." |
| r = ElementName | | From the request. | |
| s = r | | | |
| p = port | | From the request. | |
| h = Hostname | | From the request, or supplied by the DNS server. | |
| i = HostTCPaddress | | From the request, or supplied by the DNS server. | |

Application elements can query the sleedns for the address of another element. This is done by the library routine sendTo without the knowledge of the application. The SDP version of the query request looks like:

q=ST3;p=20806

The fields in the request are described in Table 5.

TABLE 5

SDP Query Fields

| Field | Required | Comments | From the Example |
|---|---|---|---|
| q = ElementName | Required | ELementName can be a maximum of 31 bytes. This is what to look for. | |
| p = port | Required | In network byte order | "20806" is how the network byte order for 18001 is reported by Linux on Intel x86's. |
| h = Hostname | Optional | Maximum size of NI_MAXHOST-1 (1023). | |
| i = HostTCPaddress | Optional | In IPv4 dot notation. | |

The reply to a query preferably has as many of the fields supplied as possible; for example, k=ACK;q=ST3;s=r;h=cpci_1.techcontrol.com; i=10.4.1.32;p=20806

If there are no registered instances of the ElementName, the reply is as follows:

k=NAK|Entry not found; q=TCS;s=q;h=cpci_1.techcontrol.com;i=10.4.1.32;p=20806

The fields in the reply are described in Table 6.

An application element can hide itself from other elements by deregistering with the local sleedns. The local server is responsible to deregister the element by multicasting to all the other servers on the network. Each deregistration is stored with the time of its receipt. If an attempt is made to deregister an element that is already deregistered, the DNS entry is updated, and the return will indicate success. Deregistering a non-existent element is also treated as a success.

The request to deregister an element is provided in the following format:

d=ST1;p=20806, with the fields described in Table 7.

TABLE 6

SDP Reply Fields

| Field | Required | Comments | From the Example |
|---|---|---|---|
| k = ACK | | | |
| k = NAK|reason | ACK or NAK is required, the reason is optional | Supplied by the DNS server. | Note that if a NAK has a reason, there is a vertical bar between the word "NAK" and the reason, which could be several words, such as "no room in table." |
| q = ElementName | | From the request. | |
| s = r | | Status of the ElementName. Can be 'r,' 'R,' (for "registered"). | On a NAK, the status will be 'q'. |
| p = port | | From the request. | |
| h = Hostname | | From the request, or supplied by the DNS server. | |
| i = HostTCPaddress | | From the request, or supplied by the DNS server. | |

TABLE 7

SDP Deregistration Requests Fields

| Field | Required | Comments | From the Example |
|---|---|---|---|
| d = ElementName | Required | ElementName can be a maximum of 31 bytes. | |
| p = port | Required | In network byte order | |
| h = Hostname | Optional | Maximum size of NI_MAXHOST-1 (1023). | |
| i = HostTCPaddress | Optional | In IPv4 dot notation. | |

The SDP version of the reply to a deregistration request is in the following format:
 k=ACK;r=ST1;s=d;h=cpci_1.techcontrol.com;
 i=10.4.1.32;p=20806

If the deregistration fails for any reason, the reply begins k=NAK|reason, with the fields described in Table 8.

TABLE 8

SDP Deregistration Request Reply Fields

| Field | Required | Comments | From the Example |
|---|---|---|---|
| k = ACK or | | | |
| k = NAK|reason | ACK or NAK is required, the reason is optional | | |
| r = ElementName | | From the request. | |
| s = d | | Supplied by the DNS server. | |
| p = port | | From the request. | |
| h = Hostname | | From the request, or supplied by the DNS server. | |
| i = HostTCPaddress | | From the request, or supplied by the DNS server. | |

Each sleedns server communicates with all the others on the network. The synchronization messages are multicast to the sleedns port on all hosts. The synchronization messages look like the original requests, with all of the optional fields filled out by the sending server. The status field is changed to upper case so that registrations are forwarded with status set to 'R' and deregistration messages have a status of 'D.'

Each host periodically multicasts a heartbeat message to the other hosts. The time between heartbeats is set in the configuration file. The heartbeat message contains a count of registered elements and the time of the last update. An example of a heartbeat message is the following:

b=967230863;e=14;i=10.4.1.32;p=20550, with the fields described in Table 9.

TABLE 9

Heartbeat Message Fields

| Field | Required | Comments | From the Example |
|---|---|---|---|
| b = UpdateTime | Required | UpdateTime is a string version of the time_t of the last time that a change was made in the shared memory table of registered elements. | 967230863 = Fri Aug 25 15:14:26 2000 |
| e = NumberOfEntries | Required | The number of registered elements in the table, not the total number of entries in the table. | "14" is the number of registered elements. |
| i = HostIpAddr | Required | The address of the host where the server is located | |
| p = Port | Optional (can be Required) | In network byte order, the port of the sending DNS server. | "20550" normalized is 18000. |

If the server receiving the heartbeat message has the same number of entries, the time from the update field and the network address of the sending server are recorded in a table. There is no acknowledgement or response to the heartbeat.

If a server receives a message with a different number of current registrations, the host with the less recent (older) update time sends a session request message with its count to the host with the more recent update time. Only one update session is allowed at a time. Once the host with the smaller number receives a session header message from a host, any other session header message is rejected. An example of a session request message is the following:

o=967230863;i=10.4.1.18;e=12;p=20550, with the fields described in Table 10.

If the server that receives the session message is able to start an update session, an acceptance message is returned that echoes back the session open request and reports that the server is ready to begin the session. The message looks like this:

k=ACK;o=967230863;i=10.4.1.18;e=12;p=20550

If the server that receives this message is already in session, or the UNIXfork function call fails, the server rejects the session by a message in the following format that follows to the sending server:

k=NAK;o=967230863;i=10.4.1.18;e=12;p=20550, with the fields described in Table 11.

TABLE 10

Session Header Message Fields

| Field | Required | Comments | From the Example |
|---|---|---|---|
| o = SessionId | Required | SessionId is a string version of the time_t of the time that the session request was sent. | 967230863 = Fri Aug 25 15:14:26 2000 |
| i = HostIpAddr | Required | In IPv4 dot notation. | |
| e = NumberOfEntries | Required | The number of registered elements in the table, not the total number of entries in the table. | "12" is the number of registered elements. Note that in the example heartbeat above there were 14 entries. |
| p = Port | Optional (can be Required) | In network byte order, the port of the sending DNS server. | "20550" normalized is 18000. |

TABLE 11

Session Reject Fields

| Field | Required | Comments | From the Example |
|---|---|---|---|
| k = ACK or | | | |
| k = NAK\|reason | ACK or NAK is required, the reason is optional | | |
| o = SessionId | | From the request | |
| i = HostIpAddr | | From the request | |
| e = NumberOfEntries | | From the request | |
| p = Port | | From the request | |

An acceptance k=ACK) message is followed immediately by the start of transmission header message. The message is in the following format:
    x=STX;o=967230863;i=10.4.1.18;e=14;p=20550,
with the fields described in Table 12.

TABLE 12

Acceptance Message Fields

| Field | Required | Comments | From the Example |
|---|---|---|---|
| x = STX | Requited | | |
| o = SessionId | | From the request | |
| i = HostIpAddr | Required | The address of the sending server, in IPv4 dot notation. | |
| e = NumberOfEntries | Required | The number of registered elements in the table on the sending server, not the number of entries in the session request. | |
| p = Port | Optional (can be Required) | In network byte order, the port of the sending DNS server. | "20550" normalized is 18000. |

Then the sending server sends a copy of each registration to the receiving host:
    r=ST4;e=14;   h=cpci_1.techcontrol.com;i=10.4.1.32;
        p=20806;o=967230863
The fields in the registration message are described in Table 13.

TABLE 13

Registration Message Fields

| Field | Required | Comments | From the Example |
|---|---|---|---|
| r = ElementName | Required | ElementName can be a maximum of 31 bytes. | "ST4" is short for "State4." There is enough room to be clear about the name, as in "ST_Alerting." |

TABLE 13-continued

Registration Message Fields

| Field | Required | Comments | From the Example |
|---|---|---|---|
| e = NumberOfEntries | Required | The number of entries on the sender at the time this message was sent (up to date in real time). | |
| h = Hostname | Optional | Maximum size of NI_MAXHOST-1 (1023). | |
| i = HostTCPaddress | Required | In IPv4 dot notation. | |
| p = port | Required | In network byte order | "20806" is how the network byte order for 18001 is reported by Linux on Intel x86's. |
| o = sessionId | Required | From the original session request | |

The receiving server can interrupt the flow when the counts are equal, as follows:

k=CAN;o=967230863;i=10.4.1.18;e=12;p=20550 with the fields described in Table 14.

TABLE 14

Interrupt Message Fields

| Field | Required | Comments | From the Example |
|---|---|---|---|
| k = CAN | Required | | |
| o-SessionID | Required | From the request | |
| i = HostIpAddr | Optional | The address of the sending server, in IPv4 dot notation. | |
| e = NumberOfEntries | Required | The number of entries on the sender at the time this message was sent (up to date in real time). | |
| p = Port | Required | In network byte order, the port of the sending DNS server. | |

The data stored by the sleedns server is preferably kept in shared memory so that it can survive the collapse and restart of the server process.

The SLEE DNS Server makes two clones of itself at initialization time by calling the UNIX system function fork. The original executable and each of the forked processes is referred to as a thread. The main thread is the original executable that is launched by the operating system and is responsible for: (1) initializing what has to be present in all threads, (2) forking the two child tasks, (3) receiving all messages over the UDP socket, (4) processing registrations, deregistration requests, and queries, (5) multicasting the synchronization messages to other servers, and (6) setting the cancellation flag to end a session for the download session thread.

The heartbeat thread is in a constant loop that waits for the amount of time in the configuration file, and then multicasts the heartbeat message.

The count rectification session thread sends a copy of each registration entry to the server that requested to see all the registrations. Its loop is controlled by the cancellation flag that may be set by the main thread.

The state machine that governs the receiving end of the count rectification is shown in Table 15.

TABLE 15

Receiving State Machine

| State | Event | Next State |
|---|---|---|
| Idle | Socket initialization succeeds | Invite |
| | Socket initialization fails | Idle |
| Invite | Failure to send (3 times) | Invite |
| | Failure to send #4 | Clean |
| Wait ACK | Receive ACK from sender | Wait STX |
| | NAK from sender | Clean |
| | Timeout (3 times) | Wait ACK |
| | Timeout #4 | Clean |
| Wait STX | STX from sender | Recv |
| | Timeout (3 times) | Invite |
| | Timeout #4 | Clean |
| Recv | Next registration | Evaluate |
| | Evaluation OK | Recv |
| | NAK to correction | Clean |
| | ACK to correction | Recv |
| | ETX from sender | Clean |

TABLE 15-continued

Receiving State Machine

| State | Event | Next State |
|---|---|---|
| Evaluate | Record matched | Recv |
| | Record not matched and added makes counts equal | Cancel |
| | Record shows more recent state here | Correct |
| Cancel | Send OK | Clean |
| | Failure to send (3 times) | Cancel |
| | Failure #4 | Clean |
| Correct | Sent NAK to sender | Recv |
| | Failure to send (3 times) | Correct |
| | Failure to send #4 | Clean |
| Clean | Clean complete | Idle |

The state machine for sending instances of sleedns is shown in Table 16.

TABLE 16

Sending State Machine

| State | Event | Next State |
|---|---|---|
| Idle | Invitation from receiver | Send ACK |
| Send ACK | Failure to send (3 times) | Send ACK |
| | Invitation from receiver | Reject |
| | Failure #4 | Clean |
| | Send OK | Send STX |
| Send STX | Send failure (3 times) | Send STX |
| | Invitation from receiver | Reject |
| | Failure #4 | Clean |
| | Send OK | Send Regs |
| Send Regs | Send failure (3 times) | Send Regs |
| | Invitation from receiver | Reject |
| | Failure #4 | Clean |
| | NAK from receiver | Evaluate |
| | Send OK | Next Record |
| Evaluate | Accept change; send ACK | Send Regs |
| | Invitation from receiver | Reject |
| | Reject change; send NAK | Send Regs |
| | Send failure (3 times) | Evaluate |
| | Failure #4 | Clean |
| Next Record | Exists | Send Regs |
| | Invitation from receiver | Reject |
| | No record | Send ETX |
| Send ETX | Send failure (3 times) | Send ETX |
| | Invitation from receiver | Reject |
| | Send failure #4 | Clean |
| | Send OK | Clean |
| Reject | Send NAK to receiver | Clean |
| | Invitation from receiver | Reject |
| Clean | Clean up complete | Idle |
| | Invitation from receiver | Reject |

Figure 9:
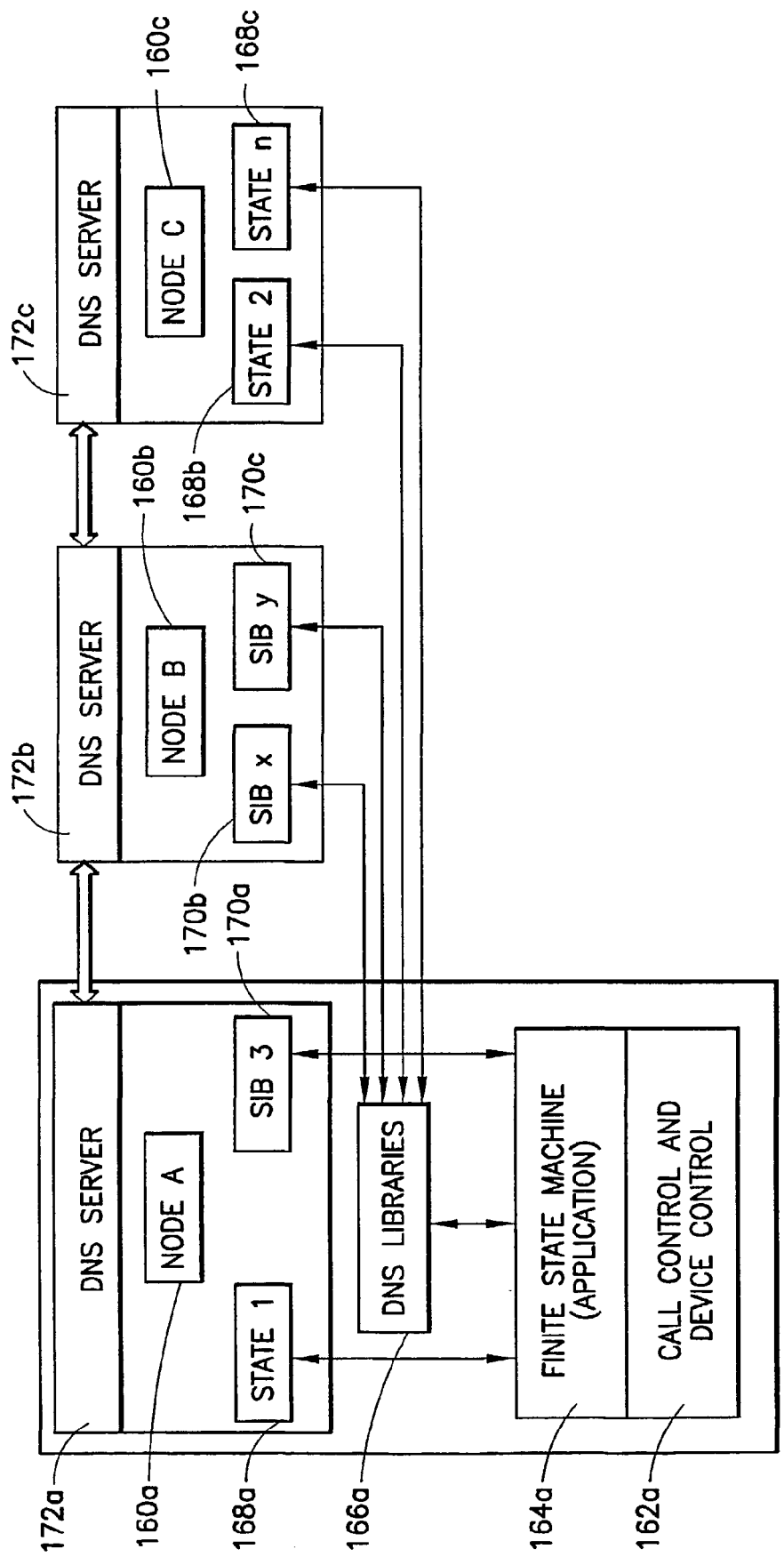
FIG. 9 is a block diagram of the SLEE DNS servers software, illustrating its scalable and distributable architecture.

The SLEE DNS servers provide the advantage of allowing for a software architecture that is infinitely scalable and fully distributed. Referring to FIG. 9, Node A 160a includes call control and device control 162, and a finite state machine 164 that controls the application. Above the finite state machine are the DNS libraries 166 that allow access to the States 168a, 168b, 168c and SIBs 170a, 170b, 170c that are distributed across the network. The DNS servers 172a (on Node A 160a), 172b (on Node B 160b), 172c (on Node C 160c) keep each other synchronized so that the server 172a on Node A is aware of the existence of the States 168b, 168c and SIBs 170b, 170c on the other nodes. The messaging libraries allow the application on Node A to execute States and SIBs on the other nodes, e.g., Nodes B and C. The other nodes can be within the same network segment, on different network segments, or even on different continents.

SLEE Library

Rather than forcing the application to learn the details of using the SLEE DNS server, the sleelib, a group of library functions, is provided to make the interface relatively clean and easy. The library is preferably written in C. Applications and application elements that use the library include specific headers files and link sleelib.o into their programs.

The library assumes the use of IP4 multicasting between network nodes so that new nodes can come on the network without being specifically known to the UNIX network configuration files. Preferably, the sleedns and sleeport modules are running on the local computer in order to pemit the library to function properly.

Figure 10:
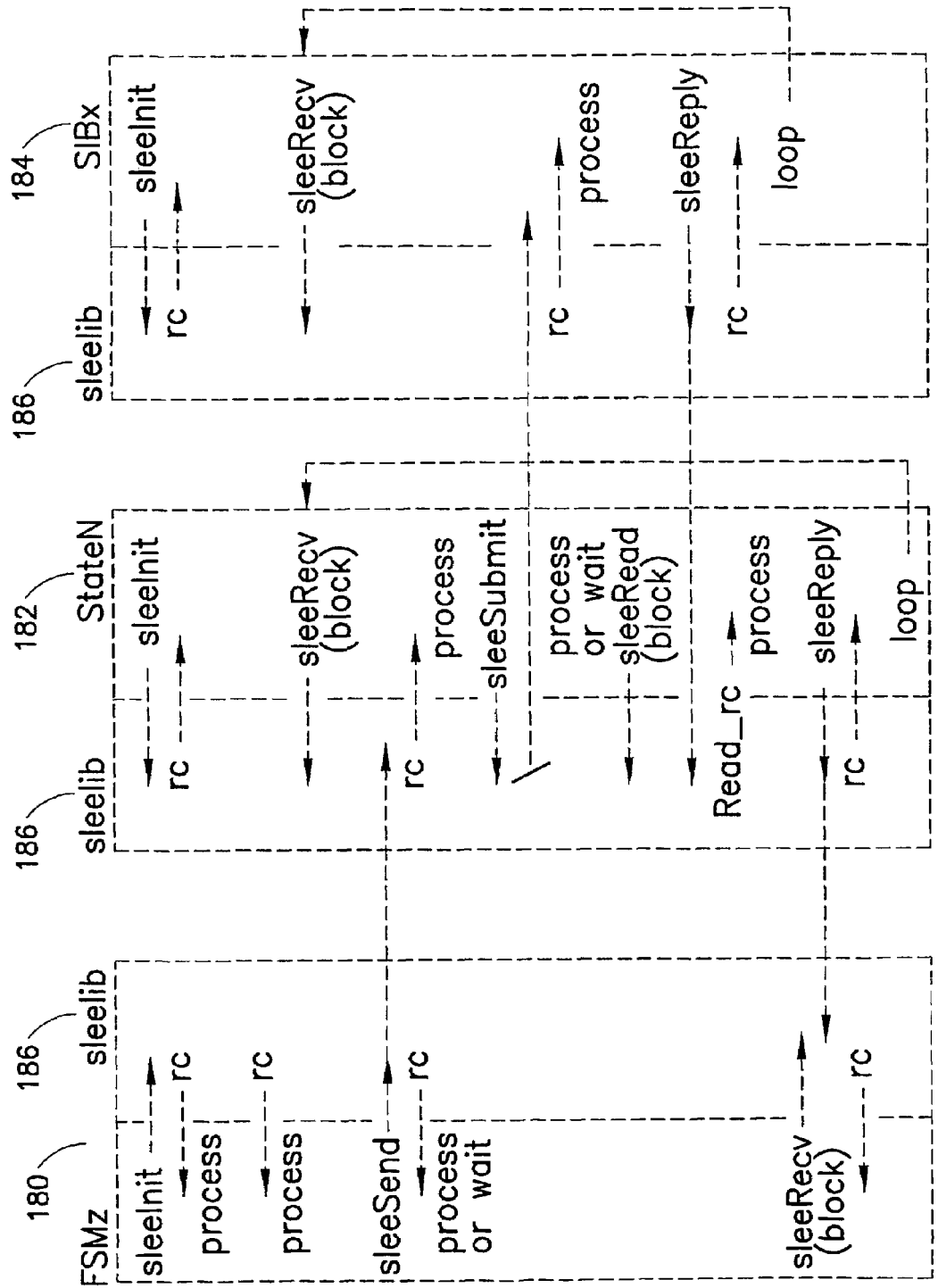
FIG. 10 is a functional diagram of the basic application elements accommodated by the SLEE library.

Referring now to FIG. 10, the three basic application elements that the library accommodates are shown: a finite state machine (FSM) 180, a state process 182, and a SIB 184. The finite state machine 180 is on the left with sleelib 186 linked in. The notation "FSMz" means "some (z) finite state machine". The state process 182 is in the middle with sleelib 186 linked in. The notation "StateN" means "some (N) state". The SIB is on the right with sleelib 186 linked in. The notation "SIBx" means "some (x) SIB". It is noted that the finite state machine 180, the state process 182, and the SIB 184 are each independent processes rather than threads.

The FSM 180 calls sleeInit during its initialization phase. After that, the FSM 180 performs whatever processing is required. When a transition occurs from one state to another, the FSM 180 sends a message to the state 182 that should do the processing by calling sleeSend. The FSM is free to continue processing while waiting for a response, or it can immediately call sleeRecv to block for a response. A loop is provided in the FSM that will lead from the bottom to the top. It is, of course, not necessary for the application on the left to be a finite state machine.

The state 182 calls sleeInit during its initialization phase. Although it is typical for the state to do little processing before waiting for input from the FSM (or some other application), it is available for processing. Eventually, the state waits for input from some other source by calling sleeRecv. When the input arrives, the state 182 processes the input as required. Eventually, the state calls sleeReply to send synchronizing information back to the FSM that sent the input. In the example shown in the FIG. 10, the state makes a call to SIB for some processing. The sending of the data is accomplished by calling sleeSubmit, and the response is read by calling sleeRead. It is not necessary for every state to call another application element (SIB). FIG. 10 merely illustrates that there is a secondary method to send data to another entity and a mechanism to receive an expected reply that will not be interleaved with other forms of input.

The SIB 184 process is substantially a replica of the state process 182, except it is simplified. The SIB calls sleeInit during its initialization phase. After that, the SIB receives input by calling sleeRecv, and it sends responses back to the sender by calling sleeReply.

For the FSM 180, the standard flow is sleeInit, sleeSend, sleeRecv. For the state 182, the standard flow is sleeInit, sleeRecv, optional calls to sleeSubmit and sleeRead, and then sleeReply. The state may then send to another state or to another SIB for additional processing. For the SIB 184, the standard flow is sleeInit, sleeRecv, sleeReply. The SIB may use sleeSubmit and sleeRead to send data to another state or another SIB for processing. Neither the state nor the SIB must reply. Of course, if the sender of the input is blocked on a reply, the state or the SIB could leave a process blocked on a sleeRecv or sleeRead forever. The effects on the robustness of the system are easy to predict. If the FSM has all of its states contained within itself, there is no need to call sleeInit, sleeSend, or sleeRecv. A similar statement hold true for the state and the SIB. Note that the FSM, the state, and the SIB are not "aware" that there is UDP messaging that leaves the elements loosely coupled. The FSM, the state, and the SIB could each be located on a different computer, and there are no geographical boundaries on the data. It is not necessary for what is shown as a finite state machine to be a finite state machine. Any type of application will do. It is not necessary for the state process to implement a "state" for a finite state machine. It is not necessary for the SIB to be in the picture. The illustration means to show a typical usage.

The sleeInit function initializes the SLEE DNS environment on behalf of an application. The function binds two UDP sockets for listening, and creates a UDP socket for communicating with the SLEE DNS server.

The sleeSend function sends the contents of sendbuf to the process registered as the "destination". The sleeSend function keeps a table of recently used addresses so that it is not necessary to do a SLEE DNS look up for each message. The sleeSend function sends sendlen bytes of data. The function will time out in some combination of seconds seconds and usec microseconds. If both seconds and usecs are zero, there will be no time out, and the function will block until the send will succeed or fail at the kernel level.

The sleeReply function provides a way for an application element to return data and/or control to the application element that sent the sleeReply function data for processing. A response can be received without interfering with the main sleeRecv/sleeReply loop.

Application elements that want to send to another application element (like a subroutine) call sleeSubmit and then receive a response by calling sleeRead. The sleeSubmit function has the responsibility to query the SLEE DNS to look up the host, IP address, and port for the named element, and to send the UDP message to that port on that host. The sleeSubmit function keeps a table of recently used addresses so that it is not necessary to do a SLEE DNS look up for each message. The sleeRead function reads for an incoming reply to a message previously sent by calling sleeSubinit.

The call processing language (CPL) of the SLEE implements EO/AT Class 5 services on the SX. Each conventional Class 5 feature is dissected into a sequence of atomic functions. Analysis of Class 5 services is used to create a transition table which maps each transition in a call sequence to a basic (or atomic) function (SIB) that performs a specific feature interaction. The call processing language (CPL) then generates a call state transition table, which is implemented in the SX BCP function. Upon initialization, the BCP loads the call state transition table into memory and uses it to determine which, if any, SIB gets called during call processing when a call transitions into a new state (e.g., idle/nul to off-hook).

The overall control of the execution of the SIBs resides within clearly defined finite state machines (FSMs) which, similar to the call state transition tables, are generated by the CPL and loaded into the SX BCP. The FSMs for the originating and terminating sides of a call are defined by the ITU, as follows.

When the calling party initiates a call, the SX BCP, which emulates an EO/AT switching exchange, starts the originating basic call state model (O-BCSM) process. The O-BCSM models the caller lifting the receiver, dialing a number, and making a call. The O-BCSM states are enumerated as follows:

O_Null: call does not exist

Auth_Orig_Attempt: detects that someone wishes to make a call

Collect_Info: dialing string is collected from the dialing party

Analyze_Info: complete string is translated into a routing address

Select_Route: actual physical route is selected

Auth_Call_Setup: relevant call type restrictions are examined

Send_Call: control of the call is transferred to the terminating basic call state model (T_BCSM) object O_Alerting: waiting for called party to answer O_Active: active conversation O_Disconnect: a disconnect message is received from the T_BCSM O_Suspended: a suspend indication is received from the T_BCSM O_Reanswer: party picks up receiver after placing it down momentarily O_Exception: cleanup, line releases, appropriate messages.

O_MidCall: signaling action by calling party (hook flash); interruption

O_Abandon: calling party hangs up before the call becomes active

The terminating basic call state model (T-BCSM) models the called party receiving a call. The T-BCSM states are enumerated as follows:

T_Null: call does not exist

Authorize_Termination_Attempt: call is verified if to be passed to the terminating party Select_Facility: terminating resource is selected Present_Call: call is presented T_Alerting: called party is alerted via ringing (timed activity)

T_Active: call enters active state

T_Disconnects: called party disconnects

T_Exception: cleanup, line releases, appropriate messages

T_MidCall: signaling action by called party (hook flash); interruption.

T_Abandon: abandon message from O_BCSM.

Figure 11:
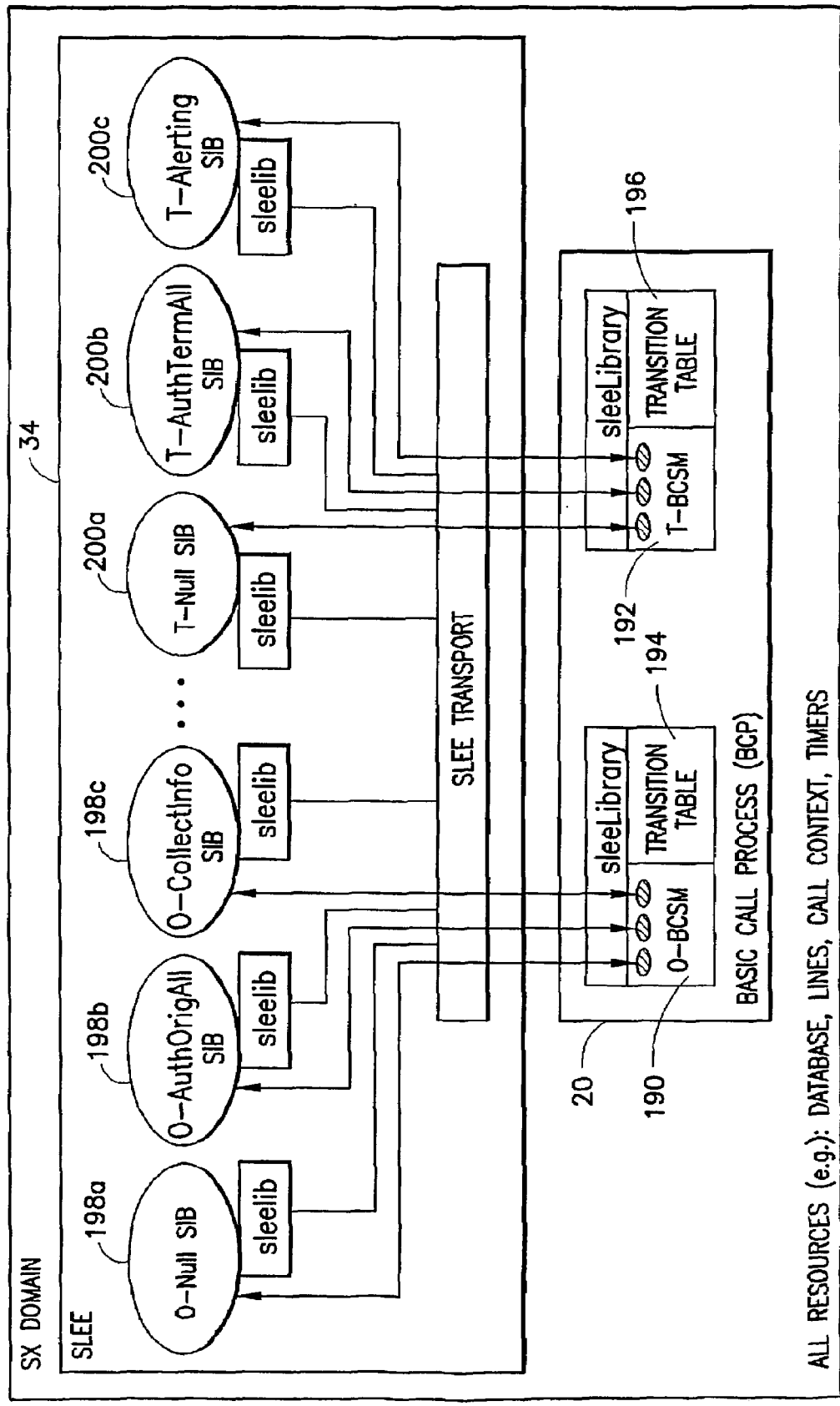
FIG. 11 shows the interaction between the basic call processing (BCP) and service level executable interface (SLEE).

Referring to FIG. 11, in order to emulate EO/AT stored program switching functions and process a high volume of calls within tight delay constraints, the call states and the events that cause transitions between them need to be made available to the SLEE 34. In addition, the call finite state machines are located close to the persistent call data, which resides within the domain of the SX 14. A tight coupling between the SLEE 34 and the SX connection control domain is made in the basic call process function (BCP) 20. The BCP 20 loads the call finite state machines (O-BCSM 190 and T-BCSM 192) and respective transition tables 194, 196 into memory and uses them to perform call control and determine which SIB 198a, 198b, 198c, . . . , 190a, 190b, 190c, . . . , if any, gets called when a call transitions into a new state. Each state has at least two outcomes, success and failure. The outcome triggers the process to the next state.

The protocol for data interaction between the SLEE state module and the finite state machines is as follows:

| Total Number of Records Within Packet | | | |
|---|---|---|---|
| Data ID₁ | Length of Data Field₁ | Data Field Description₁ | Payload₁ |
| . | . | . | . |
| . | . | . | . |
| Data ID_n | Length of Data Field_n | Data Field Descriptions_n | Payload_n |

The data types of the above fields are defined to be ANSI C data types and are listed below:
Data ID char
Length of Data Field char
Data Field Description char
Payload as described in Tables 17 and 18.

TABLE 17

Input Data Field Definitions

| Data ID | Data Length | Data Description (enums) | Payload |
|---|---|---|---|
| 1 (int) | sizeof(int) | what int is it? | value of int |
| 2 (bool) | sizeof(int) | what bool is it? | 1 or 0 |
| 3 (char) | sizeof(char) | what char? | Value |
| 4 (string) | strlen() + 1 | what string? | Value + NULL |
| 5 (bit field) | 64 bits | which (subscribed/channel) | Binary |
| 6 (prev or current state) | sizeof(int) | NULL | Value |
| 7 (event that happened) | sizeof(int) | NULL | Value |

TABLE 18

Output Data Field Definitions

| Data ID | Data Length | Data Description (enums) | Payload |
|---|---|---|---|
| 1 (int) | sizeof(int) | what int is it? | value of int |
| 2 (bool) | sizeof(int) | what bool is it? | 1 or 0 |
| 3 (char) | sizeof(char) | what char? | Value |
| 4 (string) | strlen() + 1 | what string? | Value + NULL |
| 5 (bit field) | 64 bits | which (subscriber/channel) | Binary |
| 11 (set subscriber int) | sizeof(int) | which field | Value of int |
| 12 (set subscriber bool) | sizeof(bool) | which field | 1 or 0 |
| 13 (set subscriber char) | sizeof(char) | which field | Value |
| 21 (set channel int) | sizeof(value) | which field | Value |
| 22 (set channel bool) | sizeof(int) | which field | 1 or 0 |
| 23 (set channel char) | sizeof(char) | which field | Value |
| 3x | sizzeof(int) | Tone ID from enum | value |
| 4x | sizeof(int) | Timer | Useconds |
| 50 (set subscriber bit) | 1 | which bit field | 1 or 0 |
| 51 (set channel bit) | 1 | which bit field | 1 or 0 |
| 5x (etc.) | | | |
| 60 (set next state) | sizeof(int) | NULL | Value |
| 70 (generate indication) | sizeof(int) | indicate transition to/from originating, terminating | value |

TABLE 18-continued

Output Data Field Definitions

| Data ID | Data Length | Data Description (enums) | Payload |
|---|---|---|---|
| 80 (active/passive call leg) | sizeof(char) | which call leg are we on? | Value (0/1) |

An initialization function, sleeParmsInitO, allows the initialization of the buffer that will be used to send the packet data. The functions that are used to assemble and disassemble the UDP packets are sleeParmsAddO and sleeParmsGetO, respectively. In order to release any buffers that may be dynamically allocated within the course of usage of the above routines, a clean up routine has also been implemented called sleeParmCleanO. These functions do not send or receive any data, but rather are data placeholders permitting other routines ready access to the packet information. The functions are made available to both the finite state machine (FSM) as well as directly within the SLEE and are designed to be re-entrant capable.

sleeParmsInitO

The buffer that will be used to hold the packet being built will be initialized in this routine. The entire buffer will be initialized to null characters for the sake of simplicity. The record counter that is kept to track the number of records being added to the buffer is also initialized as well as all pointers that are being used within the SLEE Parameter functions.

sleeParmsAddO

This function is used to assemble information that needs to be communicated to other processes. This assembly is callable multiple times so that multiple records can be added to a send buffer used to hold all of the packet data. The number of records added to the packet are kept track of so that the number may be added to the top of the send buffer. The function also contains standard error checking to validate information coming into the function and to send back the appropriate return values for the calling routine to evaluate.

sleeParmsGetO

This function is used to dissect all of the information within the UDP packet that has already been received and returns the information to the calling routine one record at a time. Each subsequent call to the function returns the next record available within the packet. This is done through the parameter list of the function. The function also contains standard error checking to validate the integrity of the packet being dissected and to send back the appropriate return values for the calling routine to evaluate.

sleeParmsCleanO

This function cleans up all the sleeParm functions described above. The function is placed in the function sleeCleanO (SLEE Library) and is responsible for the freeing of allocated memory and all other general clean-up that may be needed.

From the foregoing, it will be appreciated that the SLEE can operate in two modes: Mode 1, Loosely Coupled SLEE, or Mode 2, Tightly Coupled SLEE. From the perspective of a single softswitch, it is possible to implement one SLEE operating in Mode 2 and one or more SLEEs operating in Mode 1. Furthermore, from a network perspective it is possible to implement a plurality of SLEE in either mode of operation.

When describing applications for the Decoupled Telecommunications System, there are two broad classifications, Network Applications and User Applications. An example of a Network application is broadband access. Broadband access is a superset of functionalities that embody all of the essential capabilities of a Class 5 SPCS (EO/AT) in the PSTN such that the User cannot distinguish between their Class 5 service delivered through a Decoupled Telecommunications System versus a Class 5 SPCS in the PSTN.

To achieve functional equivalence to the Class 5 SPCS in a Decoupled Telecommunications System, an equivalent state machine is created through the SLEE CPL and then mobilized into the softswitch. This state machine combines the Originating and Terminating basic call state machines specified by the ITU for Capability Set 2. The SLEE function which implements this composite state machine is the Basic Call Process (BCP). The BCP is a specialized implementation of the Application Services Interworking Layer. The BCP is a byproduct of the SLEE operating in mode 2. The BCP function facilitates tightly coupled interaction between the SLEE and the softswitch. The BCP is the 'gearbox', subject to the previous analogy. SLEE mode 2 is the appropriate operational mode for the broadband access network application because it incorporates user services which are subject to the 'delay budget'.

An example of a User application is Unified Messaging (UM). Although UM is a relatively complex application, it mainly involves repeated request/response pairs of user interactions where moderate delays are acceptable. SLEE mode 1 is the appropriate operational mode for the UM application because the delay budget is not an issue and the application generally involves lengthy interactive sessions between the SLEE and other distributed Application Server elements including media servers, messaging servers and web servers using protocols that are not typically supported in a softswitch.

There have been described and illustrated herein an embodiments of methods and systems for providing integration between PSTN and IP networks. While particular embodiments of the invention have been described, it is not intended that the invention be limited thereto, as it is intended that the invention be as broad in scope as the art will allow and that the specification be read likewise. Thus, while particular files, modules, threads, parameters, etc. have been disclosed by name and with a particular implementation, it will be appreciated that other files, modules, threads, parameters, etc., with different names and implemented in different manner, yet provide the same functionality, may be used as well. In addition, while particular elements have been described as preferably being implemented in hardware and other in software, it will be appreciated that hardware elements may be implemented in software and software elements may be implemented in hardware. Most significantly, while the invention has been described with respect to an IP network, it will be appreciated that virtually any packet network may be used in lieu of an IP network. It will therefore be appreciated by those skilled in the art that yet other modifications could be made to the provided invention without deviating from its spirit and scope as claimed.

The invention claimed is:

1. A system for delivering and executing multimedia telecommunications applications over circuit and packet switch networks, said system comprising:
   a) a media gateway coupled to the PSTN and packet network;
   b) a signaling gateway coupled to the SS7 signaling network; and
   c) a service creation switch coupled to said media gateway and said signaling gateway, said switch having
      i) a generic signaling interface between the signaling gateway and the media gateway,
      ii) a management interface for coupling to a management server,
      iii) an application server interface for coupling to an application server, and
      iv) means for providing Class 5 services to said media gateway.

2. A system according to claim 1, wherein:
said switch accesses second services other than Class 5 services via said application server interface using a service level executable environment (SLEE).

3. A system according to claim 2, wherein:
said SLEE utilizes dynamically loaded shared libraries to distribute said second services over the packet network.

4. A system according to claim 2, wherein:
said SLEE includes means to locate said second services on a plurality of application servers.

5. A system according to claim 1, wherein:
said first application server interface is for coupling to a local application server, and
said switch further includes a second application server interface for coupling to a remote application server.

6. A system according to claim 5, further comprising:
   d) said second application server,
      wherein said second application server resides in the packet network.

7. A system according to claim 5, wherein:
Class 5 services are embedded in said switch.

8. A system according to claim 5, wherein:
said switch is a softswitch.

9. A system according to claim 5, wherein:
said local application server is an open service level executable environment (SLEE).

10. A system according to claim 9, wherein:
said SLEE is adapted to execute non-Class 5 service functions.

11. A system according to claim 5, wherein:
said switch is adapted to support both loosely coupled and tightly coupled application server functions.

12. A service creation switch for use with a media gateway coupled to a packet network and a PSTN, the PSTN having an SS7 signaling network, and a signaling gateway coupled to the SS7 signaling network, said service creation coupled to both the media gateway and the signaling gateway, said switch comprising:
   a) a generic signaling interface between the signaling gateway and the media gateway;
   b) a management interface for coupling to a management server; and
   c) an application server interface for coupling to an application server,
      wherein said switch includes means for providing Class 5 services to the media gateway within predetermined latency requirements.

13. A service creation switch according to claim 12, wherein:
communication over said application server interface is in Internet Protocol.

14. A service creation switch according to claim 13, wherein:

said application server is remotely located on the packet network.

15. A service creation switch according to claim 12, further comprising:

d) a service level executable environment coupled to said application server interface.

16. A service creation switch according to claim 15, further comprising:

e) means for determining whether the latency of an accessed application is within a predetermined latency requirement.

17. A service creation switch according to claim 16, further comprising:

f) means for locating an application on a plurality of application servers.

18. A method for delivering and executing multimedia telecommunications applications over circuit and packet networks, said method comprising:

a) coupling a media gateway to the circuit and packet network;
b) coupling a signaling gateway to the SS7 signaling network;
c) enabling a service creation switch to couple to the signaling gateway and the media gateway, said service creation switch adapted to provide Class 5 services to a telephone call over the packet network and the circuit network; and
e) enabling the switch to couple to an application server provided with non-Class 5 services to provide the non-Class 5 services to a call over the integrated network.

19. A method according to claim 18, wherein:

said Class 5 services are embedded in said switch.

20. A method according to claim 18, wherein:

said application server is remotely located relative to the service creation switch.

21. A method according to claim 20, wherein:

said second application server resides in the packet network.

22. A method according to claim 18, wherein:

said application server is local relative to the service creation switch.

23. A method according to claim 22, wherein:

said application server is an open service level executable environment (SLEE).

24. A method according to claim 23, wherein:

said SLEE distributes non-Class 5 services over the packet network.

25. A system according to claim 23, wherein:

said SLEE locates non-Class 5 services on a plurality of application servers in the packet network.

* * * * *